(12) United States Patent
Jaisinghani

(10) Patent No.: US 8,316,305 B2
(45) Date of Patent: Nov. 20, 2012

(54) CONFIGURING A SERVICE BASED ON MANIPULATIONS OF GRAPHICAL REPRESENTATIONS OF ABSTRACTIONS OF RESOURCES

(75) Inventor: Devendra Rajkumar Jaisinghani, Dublin, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/341,778

(22) Filed: Dec. 30, 2011

(65) Prior Publication Data

US 2012/0102180 A1 Apr. 26, 2012

Related U.S. Application Data

(63) Continuation of application No. 12/714,429, filed on Feb. 26, 2010.

(60) Provisional application No. 61/230,584, filed on Jul. 31, 2009.

(51) Int. Cl.
*G06F 15/177* (2006.01)
*G06F 15/173* (2006.01)

(52) U.S. Cl. ........ 715/734; 715/735; 715/736; 715/739; 709/220; 709/223; 709/226

(58) Field of Classification Search .......... 715/734–739; 709/220, 222, 223, 226
See application file for complete search history.

(56) References Cited

U.S. PATENT DOCUMENTS

| 5,812,533 | A | * | 9/1998 | Cox et al. ...................... 370/259 |
| 6,148,335 | A | | 11/2000 | Haggard et al. |
| 7,206,790 | B2 | * | 4/2007 | Kodama ............................... 1/1 |
| 7,225,249 | B1 | * | 5/2007 | Barry et al. .................... 709/227 |
| 7,340,520 | B1 | * | 3/2008 | Jordan et al. .................. 709/226 |
| 7,822,594 | B2 | | 10/2010 | Haviv et al. |
| 7,890,543 | B2 | | 2/2011 | Hunt et al. |
| 8,045,486 | B2 | * | 10/2011 | Swan ............................ 370/255 |

(Continued)

FOREIGN PATENT DOCUMENTS

WO WO-2011014827 A1 2/2011

(Continued)

OTHER PUBLICATIONS

"International Applicaiton Serial No. PCT/US2010/44009, International Preliminary Report on Patentability mailed Nov. 4, 2011", 5 pgs.

(Continued)

*Primary Examiner* — Tadeese Hailu
(74) *Attorney, Agent, or Firm* — Schwegman Lundberg & Woessner, P.A.

(57) ABSTRACT

A method to enable defining of a profile of a service through manipulation of graphical representations of abstractions of resources in a data center is disclosed. The profile of the service is accessed. A graphical representation of an abstraction of the first resource type is presented. A graphical representation of an abstraction of a second resource type is presented. A manipulation of the graphical representation of the abstraction of the second resource type is detected with respect to the graphical representation of the abstraction of the first resource type. Based on the manipulation, a correspondence between the abstraction of the second resource type and the profile of the service is identified and a relationship between the abstraction of the second resource type and the abstraction of the first resource type is identified. The profile of the service is updated to include information identifying the correspondence and the relationship.

17 Claims, 14 Drawing Sheets

U.S. PATENT DOCUMENTS

| | | | |
|---|---|---|---|
| 2003/0004744 A1 | 1/2003 | Greene et al. | |
| 2004/0054790 A1 | 3/2004 | Himmel et al. | |
| 2004/0103173 A1 | 5/2004 | Donatelli et al. | |
| 2004/0199572 A1 | 10/2004 | Hunt et al. | |
| 2004/0225952 A1 | 11/2004 | Brown et al. | |
| 2005/0108727 A1* | 5/2005 | Bernstein et al. | 719/320 |
| 2005/0120160 A1 | 6/2005 | Plouffe et al. | |
| 2005/0198247 A1 | 9/2005 | Perry et al. | |
| 2006/0031930 A1 | 2/2006 | Patrick et al. | |
| 2006/0059253 A1 | 3/2006 | Goodman et al. | |
| 2006/0294238 A1* | 12/2006 | Naik et al. | 709/226 |
| 2007/0174036 A1* | 7/2007 | Schmidt et al. | 703/26 |
| 2008/0016311 A1* | 1/2008 | Harada | 711/170 |
| 2008/0037532 A1 | 2/2008 | Sykes et al. | |
| 2008/0162498 A1* | 7/2008 | Omoigui | 707/10 |
| 2008/0288661 A1 | 11/2008 | Galles | |
| 2008/0289012 A1 | 11/2008 | Shi et al. | |
| 2008/0320482 A1 | 12/2008 | Dawson et al. | |
| 2009/0083717 A1 | 3/2009 | Branson et al. | |
| 2009/0171730 A1* | 7/2009 | Bobak et al. | 705/8 |
| 2009/0276771 A1* | 11/2009 | Nickolov et al. | 717/177 |
| 2009/0290513 A1* | 11/2009 | Swan | 370/255 |
| 2010/0082133 A1 | 4/2010 | Chouinard et al. | |
| 2011/0029882 A1 | 2/2011 | Jaisinghani | |

FOREIGN PATENT DOCUMENTS

| | | |
|---|---|---|
| WO | WO-2011014830 A1 | 2/2011 |
| WO | WO-2011014835 A1 | 2/2011 |

OTHER PUBLICATIONS

"International Application Serial No. PCT/US2010/044015, Written Opinion mailed Oct. 4, 2010", 12.

"International Application Serial No. PCT/US2010/044015, Search Report mailed Oct. 4, 2010", 12.

"International Application Serial No. PCT/US2010/44003, Search Report mailed Sep. 23, 2010", 14.

"International Application Serial No. PCT/US2010/44003, Written Opinion mailed Sep. 23, 2010", 14.

"U.S. Appl. No. 12/714,429, Non Final Office Action mailed Mar. 28, 2012", 11 pgs.

"U.S. Appl. No. 12/714,429, Preliminary Amendment filed Jun. 3, 2011", 12 pgs.

"International Application Serial No. PCT/US2010/44009, International Preliminary Report on Patentability mailed Nov. 4, 2011", 5 pgs.

"International Application Serial No. PCT/US2010/044003, International Preliminary Report on Patentability mailed Oct. 5, 2011", 26 pgs.

"International Application Serial No. PCT/US2010/044009, Search Report mailed Sep. 27, 2010", 8 pgs.

"International Application Serial No. PCT/US2010/044009, Written Opinion mailed Sep. 27, 2010", 8 pgs.

"International Application Serial No. PCT/US2010/044015, International Preliminary Report on Patentability mailed Feb. 9, 2012", 7 pgs.

"International Application Serial No. PCT/US2010/044015, Search Report mailed Oct. 4, 2010", 2 pgs.

"International Application Serial No. PCT/US2010/044015, Written Opinion mailed Oct. 4, 2010", 5 pgs.

"International Application Serial No. PCT/US2010/44003, Search Report mailed Sep. 23, 2010", 2 pgs.

"International Application Serial No. PCT/US2010/44003, Written Opinion mailed Sep. 23, 2010", 7 pgs.

Jaisinghani, Devendra Rajkumar, "Management of Services and Resources", U.S. Appl. No. 61/230,584, filed Jul. 31, 2009, 41 pgs.

* cited by examiner

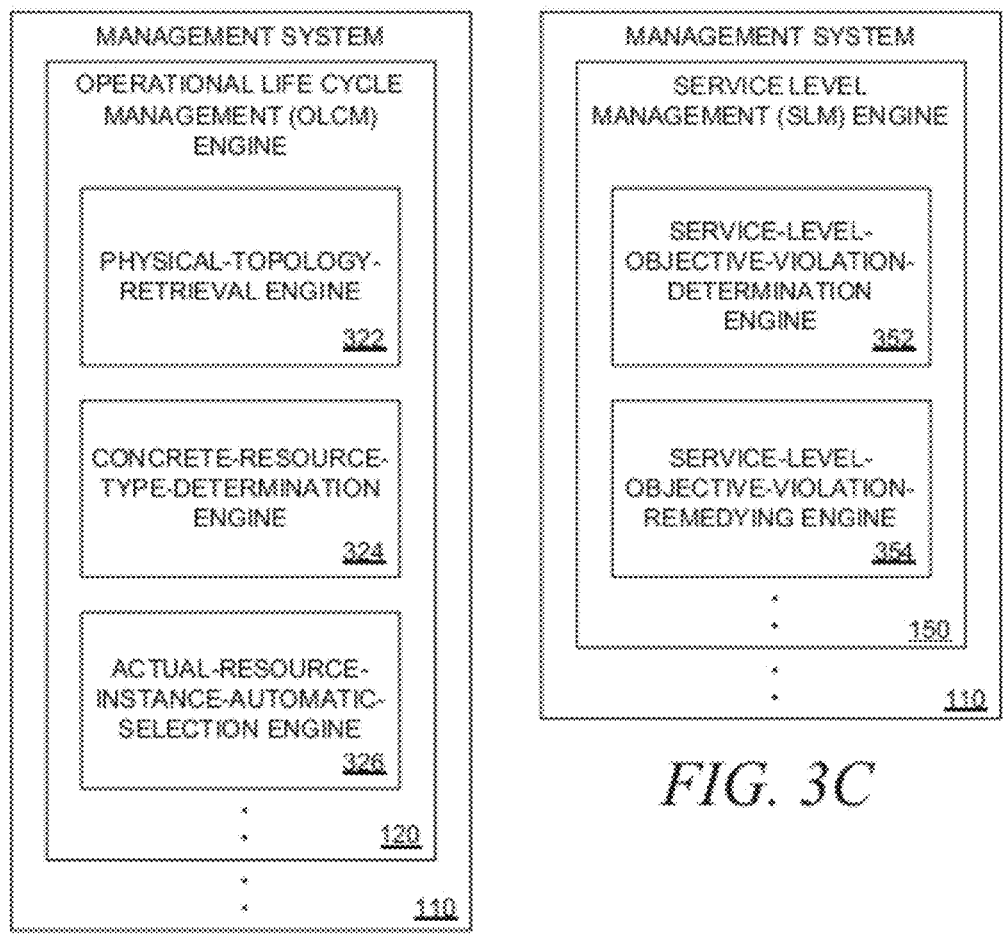
FIG. 3A
FIG. 3C
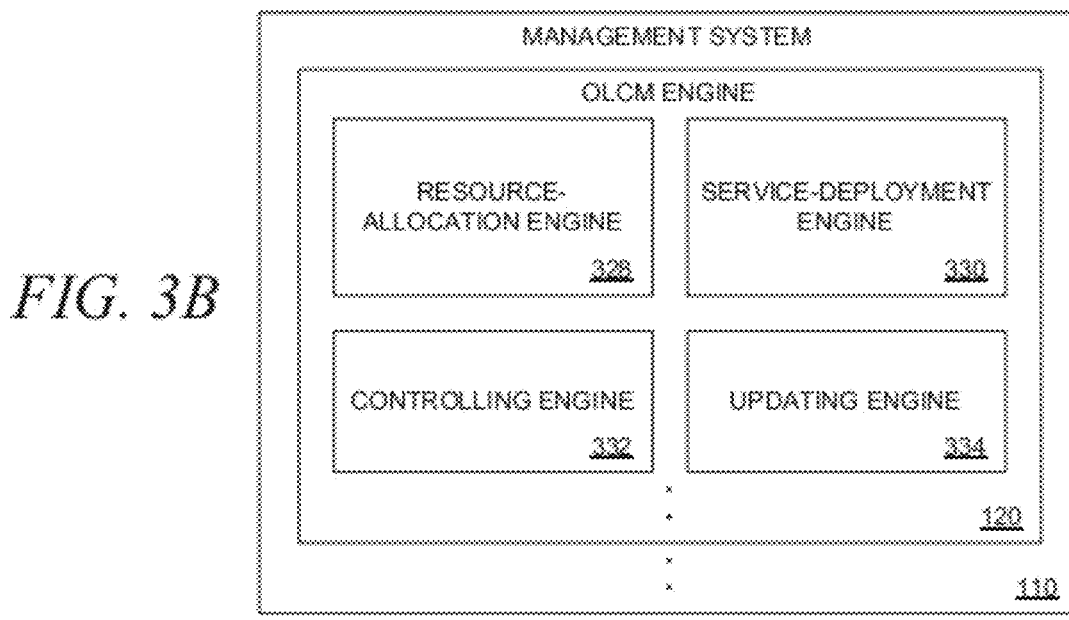
FIG. 3B

CONFIGURING A SERVICE BASED ON MANIPULATIONS OF GRAPHICAL REPRESENTATIONS OF ABSTRACTIONS OF RESOURCES

CROSS-REFERENCE TO RELATED APPLICATIONS

This application is a continuation of U.S. application Ser. No. 12/714,429, filed on Feb. 26, 2010 and entitled "Cloud Computing: Unified Management Console for Services and Resources in a Data Center", which claims the priority benefit of U.S. Provisional Application No. 61/230,584, entitled, "Management of Services and Resources," filed Jul. 31, 2009, which applications are hereby incorporated herein by reference in their entirety.

TECHNICAL FIELD

The present application relates generally to the technical field of management of data centers. In one specific example, embodiments of the inventive subject matter relate to a method and system that unifies, in a management system, operational lifecycle management (OLCM) and service level management (SLM) of services and resources in an infrastructure environment, such as a cloud computing environment or data center environment.

BACKGROUND

A large infrastructure, such as the infrastructure utilized by eBay's Marketplace, may span multiple infrastructure environments. The multiple infrastructure environments may include a data center environment, a cloud computing environment, or another environment that incorporates compute, network, storage, operating system, application, and other resources. Various services deployed on the infrastructure, such as search and messaging services, may use these resources to accomplish various business objectives. The services themselves may span multiple infrastructure environments. To manage the operational lifecycle of these services and resources, many tools and scripts may be built or brought in over a period of time in an ad-hoc manner by different groups of people. As a result of, for example, the tools and scripts being set up over time, many problems related to managing such services and resources may arise. Thus, there is a need for a management system that enables cohesive and systemic management, including OLCM and SLM, of services and resources that span multiple infrastructure environments.

BRIEF DESCRIPTION OF THE DRAWINGS

Some embodiments are illustrated by way of example and not limitation in the figures of the accompanying drawings in which:

FIG. 3A is a block diagram of various hardware or software engines that comprise an example embodiment of the OLCM engine of the management system of FIG. 1;

FIG. 3B is a block diagram of additional hardware or software engines that comprise an example embodiment of the OLCM engine of the management system of FIG. 1;

FIG. 3C is a block diagram of various hardware or software engines that comprise an example embodiment of the SLM engine of the management system of FIG. 1;

DETAILED DESCRIPTION

Figure 1:
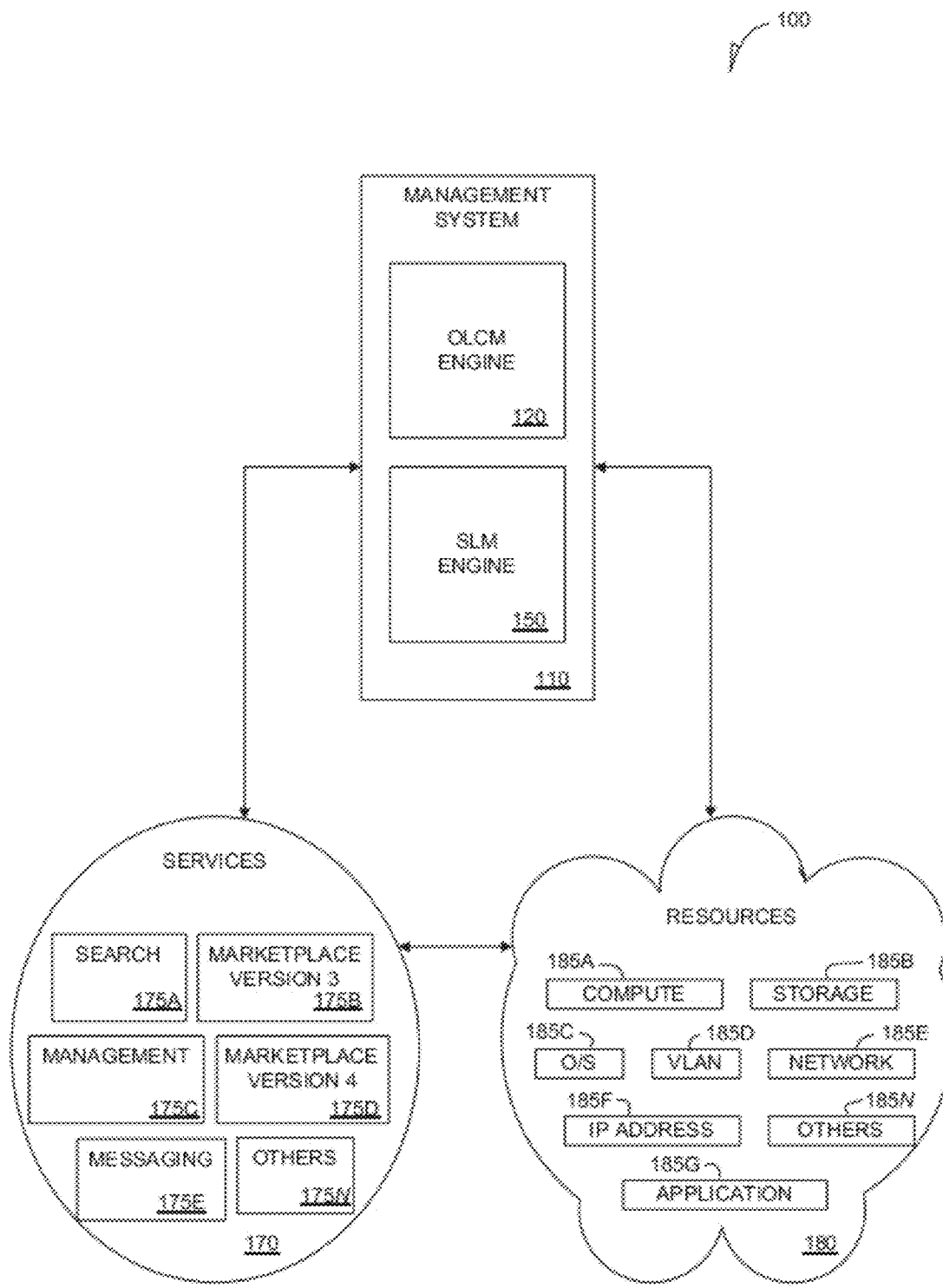
FIG. 1 is a block diagram indicating relationships between services that may be deployed in an environment such as a data center, a cloud, or another infrastructure environment; resources in the infrastructure environment; and a management system to manage the services and the resources, in accordance with various embodiments described herein.

The description that follows includes illustrative systems, methods, techniques, instruction sequences, and computing machine program products that embody the inventive subject matter presented herein. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in an inclusive or exclusive sense. Further, the term "data center" may refer to a data center, a cloud, or any infrastructure environment having a resource on which a service can be deployed. Thus, any specific reference to a data center or cloud is provided merely for clarity. It should be understood that a service may be deployed in the data center, the cloud, or an infrastructure environment, or split between them. Furthermore, the data center may be located locally to or remotely from an enterprise and is still to be considered as being within a scope of various embodiments of the present invention. Additionally, the data center may include services and resources located in proximity to one another or, alternatively, the services and resources may be geographically distributed. Furthermore, the terms "modeled topology" and "logical topology" may be used interchangeably.

In an example embodiment, a method to enable defining of a profile of a service through manipulation of graphical representations of abstractions of resources in a data center is disclosed. The profile of the service is accessed. The profile of the service includes information identifying a correspondence between an abstraction of a first resource type and the service and the first resource type corresponds to a resource in a data center. A graphical representation of an abstraction of the first resource type is presented. A graphical representation of an abstraction of a second resource type is presented. The second resource type corresponds to a resource in a data center. A manipulation of the graphical representation of the abstraction of the second resource type is detected with respect to the graphical representation of the abstraction of the first resource type. Based on the manipulation, a correspondence between the abstraction of the second resource type and the profile of the service is identified and a relationship between the abstraction of the second resource type and the abstraction of the first resource type is identified. The profile of the service is updated to include information identifying the correspondence between the abstraction of the second resource type and the profile of the service and the relationship between the abstraction of the second resource type and the abstraction of the first resource type.

Architecture

FIG. 1 is a block diagram 100 of an exemplary infrastructure environment, such as a data center, and is shown to include relationships between services 170, resources 180, and a management system 110. The services 170 can include, for example, search services 175A, version 3 marketplace services 175B, management services 175C, version 4 marketplace services 175D, messaging services 175E, and any other service 175N that utilizes resources and can be managed. The resources 180 can include, for example, computer resources 185A, storage resources 185B, operating system resources 185C, VLAN resources 185D, network resources 185E, IP address resources 185F, application resources 185G, and any other resource 185N that the services 170 may utilize. In an example embodiment, the management system 110 includes an operational lifecycle management (OLCM) engine 120 for, among other things, deploying the services 170 such that they use resources selected from the resources 180. In an example embodiment, the management system 110 also includes a service level management (SLM) engine 150 for, among other things, monitoring the services 170 and the resources 180 and dynamically allocating at least one of the resources 180 such that each of the services 170 maintains a specific service level as defined by key performance indicators (KPIs), such as mean response time or throughput.

In an example embodiment, the services 170 and the resources 180 are coupled to the management system 110 such that the management system 110 can manage the services 170 and the resources 180 using the OLCM engine 120 and the SLM engine 150. In an example embodiment, ones of the services 170 and one or more of the resources 180 are coupled such that one or more of the resources 180 are allocated for ones of the services 170 or ones of the services 170 are deployed such that they use one or more of the resources 180.

Figure 2:
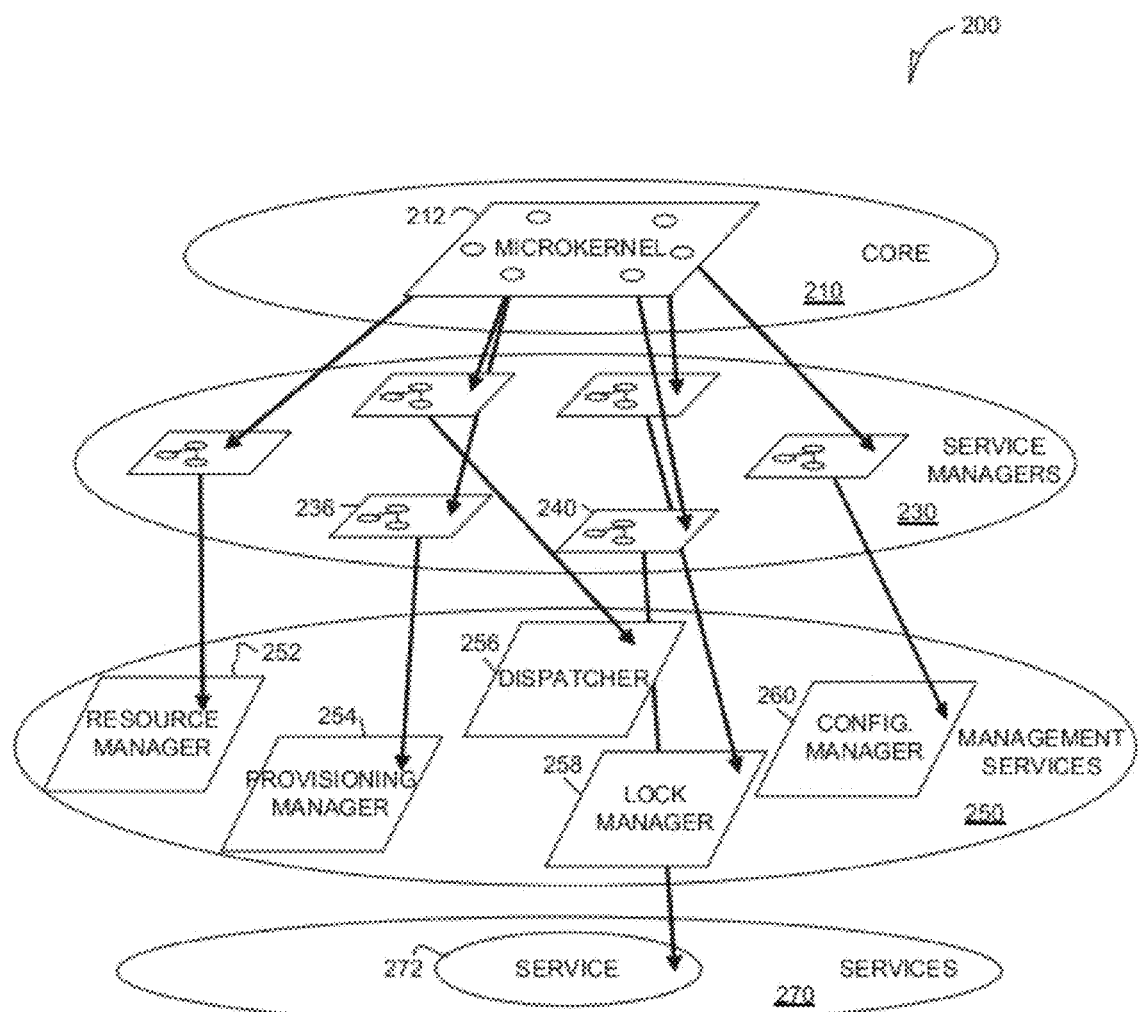
FIG. 2 is a block diagram of an example embodiment of an architecture for the management system of FIG. 1.

FIG. 2 is a block diagram of an example embodiment of an architecture 200 for the management system 110 of FIG. 1. The architecture 200 includes a core 210, service managers 230, management services 250, and services 270. The core 210 includes a microkernel 212 that provides service registry and lookup capabilities, and uses specialized controllers (not shown) to manage the operational life cycle and service level of one or more of the service managers 230. Each of the service managers 230 may be responsible for the complete OLCM and SLM of one of the management services 250 or the services 270.

Each of the service managers 230 receives or obtains a state $s_t$ (not shown) of the system (e.g., in this case, a service) at time-step t. If needed, one or more of the service managers 230 makes decisions based on policies and consequently takes action at action $a_t$ (not shown). As a result of the actions taken or some other notable event happening (for example, a failure), the system state changes (at time-step t+1), and the cycle repeats. Both state and action are vectors. State is specified in terms of system configuration, system performance, operational mode (e.g., maintenance mode), and operational status (e.g., serving traffic, marked down, etc.). Action is specified in terms of life cycle actions such as software provisioning, addition of capacity (e.g., compute/network/storage), failure recovery (e.g., auto-reboots), powering off a server, etc.

Thus, the service managers 230 can be considered system controllers and it is here that a feedback loop closes. More precisely, the controllers (not shown) inside each of the service managers 230 close individual feedback loops, where each loop can pertain to a single managed entity. Each controller also maintains the state of the resources that it manages where state is a vector defined in terms of the performance, configuration, operational mode, and operational status of the managed resource.

To perform the OLCM operations, and in particular to perform operations on various hardware and software resources, a controller uses an adaptor (not shown explicitly). The adaptor provides a transformation of commands given from the controller to the native commands exposed by the managed resource. A controller may also use other internal management services as well, for example, a provisioning manager 254. A controller is specific to an abstract type, such as a load balancer, whereas an adaptor is specific to a concrete type, such as, for example, a Citrix® NetScaler® load balancer. To support new resources, corresponding adaptors are implemented whereas to support new resource or service types, corresponding controllers are implemented. The OLCM operations involve sequencing of various tasks. The sequencing may be accomplished by an orchestrator (not shown explicitly) inside each of the service managers 230. The orchestrator takes as an input a Directed Acyclic Graph (DAG) of tasks and executes the tasks with the objective of minimizing a total completion time. As such, the orchestrator identifies independent tasks, if any, and executes them concurrently.

With continuing reference to FIG. 2, the management services 250 are shown to include a resource manager 252, a provisioning manager 254, a dispatcher 256, a lock manager 258, and a configuration manager 260. In this example embodiment, the dispatcher 256 is the point of entry into the management system 110. The dispatcher 256 provides user authentication and authorization and creates and maintains user sessions. In an example embodiment, user authentication is delegated to a separate lightweight directory access protocol (LDAP) server. User authorization is done internally based on roles and privileges. On successful authentication and authorization, a user session is created, and the session persists until it times out (tunable) or when the user logs out. The dispatcher 256 sends the user requests such as that for service deployment to an appropriate one of the management services 250 or the service managers 230 (e.g., the service manager 240). The dispatcher 256 first looks up the endpoint of the service in its internal cache; if this first look up fails, the dispatcher 256 does a service lookup with the microkernel 212. Thereafter, the dispatcher 256 directly communicates with an appropriate one of the management services 250 or the service managers 230.

The configuration manager 260 stores the profiles and the topologies (both logical and physical) in its configuration repository (not shown explicitly). To maintain independence from both the technology and a vendor of the configuration repository, the configuration manager 260 has a service layer that abstracts the configuration repository. To maintain model independence, the configuration manager 260 may operate on a meta-model. Specifically, the configuration manager 260 may transform a graph (as, for example, the graph manifested in an XML document for a topology) into relational database tables using meta-model constructs. Each meta-object except one relating to dynamic values, such as performance data, has a corresponding table in the database. Analogous to a source code management system (known independently in the art), the configuration manager 260 may create or maintain version vectors for the profiles, logical topologies, physical topologies, or constituent objects in the logical topologies or the physical topologies. Thus, a logical topology may be realized from a particular version of a profile. Furthermore, a physical topology may be created from a specific version of a logical topology. Additionally, the system can roll back (or forward) a service to a previous (or later) version of its deployed topology. The configuration manager 260 also verifies the deployed configurations to ensure that there is no configuration drift (e.g., an out-of-band or otherwise unexpected configuration change made to a service or resource). The specified configuration is called "What It Should Be" (WISB) and the configuration as read from the managed resources is called "What It Really Is" (WIRI). When a drift is detected, a relevant one of the Service Managers 230 can take appropriate corrective actions based on policies set by, for example, a system administrator or other person responsible for the infrastructure.

The provisioning manager 254 deploys an operating system, application stack (e.g., Java® Virtual Machine (JVM) or servlet container), and application code to compute elements (e.g., servers). Since a variety of specialized products and tools are available off-the-shelf for these specialized tasks, the provisioning manager 254 provides a service layer that abstracts the underlying tools using adaptors. Examples of such tools include, but are not limited to, Altiris® by Symantec® for OS deployment and Tivoli® Provisioning Manager by IBM® for application stack and code deployment. The clients of the provisioning manager 254 (e.g., the relevant controllers in the service manager 236) are not exposed to the underlying tool, and instead deal with the normalized interface exposed by the provisioning manager 254.

The resource manager 252 reserves and allocates resources. Reservations are leased; that is, they expire if they are not used by a service. The reservations can be made permanent (or up to a specified maximum duration) by doing a resource allocation. The resource allocation happens when a service deployment command is issued. The resource manager 252 may also dynamically assign resources at an initial resource allocation (for example, if initial resource allocation is automated) or during maintenance of SLOs when a service has been deployed. The resource manager 252 may adjust, perhaps periodically, the resource allocation between services to, for example, minimize resource consumption while maintaining Service Level Agreements (SLAs). For example, the resource manager 252 may invoke or provide functionality equivalent to the service-level-objective-violation-remedying engine 354.

Resources can be shared between different services, if appropriate. If multiple ones of the service managers 230 access a shared resource concurrently, there is a chance of creating inconsistency in the configuration of the resource as not all resources enforce or provide serialized access. Therefore, to prevent concurrent access to a shared resource, an out-of-band synchronization or mutual exclusion mechanism can be provided. The exclusion mechanism can be achieved by the lock manager 258. To access any resource, one of the service managers 230 first obtains a lock from the lock manager 258 and relinquishes it after its session with the managed resource is completed. Locks are leased; that is, they expire after the duration specified in the request. Using leased locks allows the system to recover gracefully from failures of lock holders. A lease can be extended subject to some tunable maximum to prevent a thread from waiting indefinitely for a lock (lock starvation) and ensure locks are issued in as close to arrival order as possible in a manner that is specified, consistent, and in accordance with the needs of a program (lock fairness). Locks are also reentrant. Further, the locks are persistent; that is, they survive restart or failure of both the lock manager 258 and service managers 230.

In an example embodiment, the architecture 200 may include at least two additional subsystems: an event system and a monitoring system (neither of which is shown). The event system is used to transport and process events (e.g., alerts, notifications, and performance metrics transported as events) from managed resources to the subscribed controllers in various ones of the service managers 230. The monitoring system is used to enable monitoring for all managed ones of the services 270 and resources, and abstract various monitoring tools.

Each management service (except the microkernel 212) and each of the service managers 230 has an associated topology. The topologies for the management services and associated ones of the Service Managers 230 are bundled with the system whereas those for the Service Managers 230 that manage services deployed in the data center are constructed on demand. Service-orientation and declared configurations in the form of topologies allow the system to be bootstrapped, and essentially, self-managing.

When the system is started, only the microkernel 212 gets started. At startup, the microkernel 212 creates the relevant controllers. Using the controllers, the microkernel 212 deploys the service managers 230 for the management services 250 based on the profiles stored in the system. The controllers register their respective ones of the service managers 230 with a registry component in the microkernel 212. Thereafter, the microkernel 212 asks each of the service managers 230 to deploy respective ones of the management services 250 by passing in the relevant respective topologies. There is a respective topology stored each for the dispatcher 256, the configuration manager 260, the resource manager 252, the lock manager 258, and the provisioning manager 254. On successful deployment, the microkernel 212 registers the respective ones of the management services 250 with its registry component.

The microkernel 212 uses the same mechanism to deploy a service in an infrastructure environment. For example, the microkernel 212 deploys a service manager 240 for the service 272. Then the service manager 240 deploys the service 272. Recall that, in an example embodiment, each controller inside each of the service managers 230 manages the OLCM and SLM for its managed entity, and that each of the service managers 230 has controllers, one per each type of service or resource being managed. When a managed service fails or its performance starts lagging, its service manager (via its controllers) can take failure recovery or compensating actions based on pre-determined policies. The same approach or mechanism is also used internally in the system for the management services (the dispatcher 256, the resource manager 252, etc.). The service managers 230, being services themselves, are managed by their respective controllers in the microkernel 212.

This recursive model of service-orientation and service management enables the system to be self-managing to a large extent. An exception to this recursive model could be the microkernel 212 since this is the point at which the recursion stops. As such, in an example embodiment, the microkernel 212 is made highly available (for example, using high availability (HA) clustering solutions).

FIG. 3A shows an example embodiment of the management system 110 in more detail. In FIG. 3A, the management system is shown to include the OLCM engine 120. The OLCM engine 120 is shown to include a physical-topology-retrieval engine 322 to retrieve a physical topology of a service. The physical topology may specify both the concrete type and the instance of the resources used. Alternatively, the physical topology may specify only the concrete type of the resources used, allowing the management system 110 to allocate the actual instances of the resources in the data center. As such, the physical topology is used for deployment of a service.

In FIG. 3A, the OLCM engine 120 is also shown to include a concrete-resource-type determination engine 324 to determine from the physical topology a concrete type of a resource that the service requires.

In FIG. 3A, the OLCM engine 120 is also shown to include an actual-resource-instance-automatic-selection engine 326 to automatically select one or more actual instances of the resources in the data center for allocation to the service using specified policies and constraints to, for example, minimize resource consumption while maintaining SLAs.

FIG. 3B shows another embodiment of the management system 110 wherein the OLCM engine 120 comprises engines in addition to those shown in FIG. 3A. In FIG. 3B, the OLCM engine 120 is shown to include a resource allocation engine 328 to allocate selected resources to be used by the service. When a service is ready to be deployed, the service may be allocated resources. This is done in the resource allocation phase. However, the allocation may be temporary; that is, the resources are reserved for some finite time. If the service is not deployed within the specified time limit, the resources may be freed up to be used by other services. The relevant physical topology is retrieved from the management system and the necessary bindings to the physical resources are created. The resource allocation can be manual, fully automated, or a combination of manual and automated allocation. If the allocation is manual then it will typically be done by a capacity management team in conjunction with an operations architect. If instead the allocation is automated, then the management system will allocate resources using specified policies and constraints. In an example embodiment, each physical resource is identified by an asset type and an asset ID. The asset ID typically contains an identifier such as a Globally Unique Identifier (GUID). The GUID is unique within the context of a namespace (for example, eBay). It should be noted that, in an example embodiment, not all resource allocation is done immediately. Some allocations can be done lazily (for example, allocations of software resources and IP Address assignment). For example, the binding happens after the software resource has been provisioned. In an example embodiment, once the physical topology is updated, it is saved and versioned in the management system 110.

In FIG. 3B, the OLCM engine 120 is also shown to include a service-deployment engine 330 to deploy a service such that the service uses the selected resources. Once the service has been approved for deployment, the deployment happens in this phase. The corresponding physical topology of a specified version is retrieved from the management system 110 and the system provides the deployment. The management system 110 verifies that the resource reservations done in the resource allocation phase are still valid, and accordingly makes the allocations permanent. The management system 110 auto-generates an orchestration plan from the given topology based on pre-determined rules. The management system 110 then performs a dry run informing the user of the impending actions and, on due approval, proceeds with the deployment. During deployment, the user is kept fully in the loop with deployment status and progress updates. In an example embodiment, deployments are intended to be performed by operations personnel, typically, system administrators. However, deployment of code is typically intended to be performed by developers.

In FIG. 3B, the OLCM engine 120 is also shown to include a service controlling engine 332. Once a service has been deployed, the service can be controlled. Control actions may include start, stop, activate, and deactivate operations. There may be a symmetrical reverse operation (e.g., stop, deactivate, or undeploy) for each respective forward operation (e.g., start, activate, and deploy). Furthermore, the symmetrical reverse operation may be invoked substantially immediately after the respective forward operation is invoked or the forward operation may be invoked substantially immediately after the respective reverse operation is invoked. The management system 110 provides capabilities to the user (or another software tool) to initiate a control action on the service as a whole or constituent resources or groups thereof. The management system 110 auto-generates the orchestration plan from the given topology based on rules, if not already completed. For every control action, the management system 110 performs a dry-run informing the user of the impending actions and resultant changes, and on due approval, proceeds with the execution of the control action. During execution, the user is kept fully in the loop with status and progress updates. In an example embodiment, control actions are intended to be performed by operations personnel, typically network operations center (NOC) personnel and system administrators.

With continuing reference to FIG. 3B, the OLCM engine 120 is also shown to include an updating engine 334 to update a deployment profile, modeled deployment topology, physical topology, or service. Updates to profiles can be made simply by saving a new version of the profile. Updates to existing topologies can be made by using the editing facilities provided by the management system. Updates to a deployed service are made simply by instructing the management system to deploy a physical topology of a different version. The management system 110 is smart enough to determine a difference (the delta) between the deployed version and the to-be deployed version, and then perform actions corresponding to the computed delta. As before, management system 110 performs a dry-run and informs the user of the impending actions and the resultant changes.

The OLCM engine 120 may also include a service undeployment engine (not shown) to undeploy a service or a resource deallocation engine (not shown) to deallocate or free resources. The undeployment engine and the resource deallocation engine may act concurrently or serially to deallocate resources for a service. Furthermore, the undeployment engine may include a safety state in which a service cannot be undeployed if it is running or otherwise active.

FIG. 3C shows another embodiment of the management system 110 that is shown to include the SLM engine 150 in addition to the OLCM engine 120 of FIG. 3A or FIG. 3B. The SLM engine 150 is shown to include a service-level-objective-violation-determination engine 352 to determine whether a service or a resource has violated or is in danger of violating a service-level objective (SLO). SLOs are defined on Key Performance Indicators (KPIs). In an example embodiment, an SLO might be defined on the following KPIs of a service: mean response time or throughput. For example, an SLO might be to keep the response time of the service to less than 5 ms, 90% of the time in a 24-hour interval. Alternatively, an SLO might be to keep the response time of a service to be always less than 10 ms. The service-level-objective-violation-determination engine 352 may maintain the SLO definitions. The service-level-objective-violation-determination engine 352 may also monitor the KPIs for the services and consumed resources. In an example embodiment, clients communicating with the management system 110 may present in a user interface charts or graphs of various performance metrics. Furthermore, a user may customize a user interface to observe the metrics and charts of interest. The user interface may also present summary performance information. The service-level-objective-violation-determination engine 352 may also generate alerts on failure or when the SLOs get violated or are in danger of being violated. The service-level-objective-violation-determination engine 352 may serve as an event system or channel between the managed entities and the control layer (neither of which is shown explicitly in FIG. 3C) that provides information about failures and alerts (e.g., those pertaining to crossed thresholds). The event system also provides information about expected events such as start, stop, and so on. In an example architecture (see FIG. 2), the event system may provide the information in response to actions taken by the service managers 230 on their managed services. In addition to these, the service managers 230 in the control layer may also need to know about various resource utilization, response time, and throughput metrics so that the service managers 230 can proactively take action to manage the service levels. The metrics may be generated periodically. A system built for transporting asynchronous information can always transport synchronous information. Thus, the metrics may be collected and sent, synchronously or asynchronously, on the event system from the managed resources or services to the service-level-objective-violation-determination engine 352, which may then determine if there is an SLO violation. From the above, it may be inferred that the use of such an event system also allows the service managers 230 to compute the state of their respective services.

In an example embodiment, clients communicating with the management system 110 may present in a user interface a summary of performance information and corresponding color-coded markers in context with a displayed topology. For example, a green marker associated with a service or resource indicates all relevant KPIs are within expected ranges, an amber marker indicates there is cause for some concern, and red indicates an unexpected or abnormal condition, including a failure or an SLO violation. Using visual indicators in context provides a mechanism for operations personnel to quickly determine if there is a problem, and if so, the chance of propagation of problem to other resources or services.

With continuing reference to FIG. 3C, the SLM engine 150 is also shown to include a service-level-objective-violation-remedying engine 354 that may remedy a SLO violation upon detection. For example, the service-level-objective-violation-remedying engine 354 may dynamically allocate resources for a service. The dynamic allocation may be performed according to a physical topology of the service such that a cost of the resources is balanced with a benefit of meeting the service-level objective. For example, high service levels play a role in consumer retention and contribute to higher revenue. However, there is an inherent tradeoff between the service levels that the system provides to its consumers and the cost that it incurs in providing those service levels. (The system cost is at least partially specified in terms of resources consumed.) Therefore, the management system 110 may strike a balance between the two to, for example, minimize resource consumption while maintaining SLAs. Mathematically, such balancing can be stated as:

$$\text{System Profit} = f(\text{Service-Level Objectives, System Cost})$$

Stated differently, the management system 110 may allocate resources to service(s) to provide maximum utility to a business over an infinite time horizon. Thus, to do true service level management, the management system 110 may have a capability to allocate judiciously one or more resources to various services. In particular, the service-level-objective-violation-remedying engine 354 may have a decision-making capability to allocate or deallocate resources to or from services based on the SLOs. That is, the service-level-objective-violation-remedying engine 354 may judiciously allocate resources to newly deployed services as well as reallocate resources between services during runtime to meet the SLOs. The service-level-objective-violation-remedying engine 354 may consider the state of the managed services at the current time and determine if their states are "good" states. If the states are not good, then the dynamic-resource-allocation engine 358 may proactively move the managed services to a "better" state through a system reconfiguration. In an example embodiment, the system reconfiguration requires due operator approval. While allocating resources to different services, the service-level-objective-violation-remedying engine 354 may minimize resource consumption while maintaining SLAs. The decision-making capability may be based on one or more policies. For example, a failure of a service or a resource (e.g., a load balancer) may require a resource allocation, a deployment, a start, or an activation of another service or resource (e.g., another load balancer). As another example, a failure of a running application (e.g., a tomcat server) may require a restarting of the running application, and, if the condition persists after, for example, 3 retries, then the failure of the running application may further require a generating of an alert to be sent to a network operations center (NOC). As another example, if a load on a service increases (and is, for example, within allowed limits), then additional capacity may be added. The service-level-objective-violation-remedying engine 354 or a controller, such as a controller in one of the service managers 230, may retrieve the one or more policies from a policy repository. The policy repository may be associated or managed by the management system 110, or programmatically exposed to one of the various clients 702 for management by the one of the various clients 702 or a user.

Figure 4A:
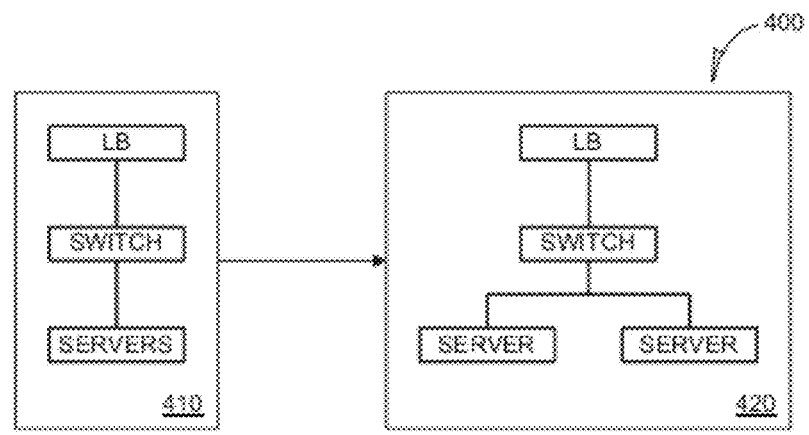
FIG. 4A is a block diagram of an example embodiment of a logical topology being created from a profile.

FIG. 4A shows a very simple example of a conceptual depiction 400 of a logical topology 420 being created from a profile 410. One variable in the profile 410 as shown is the number of servers. When the logical topology 420 is created, the number of servers is specified as two.

Figure 4B:
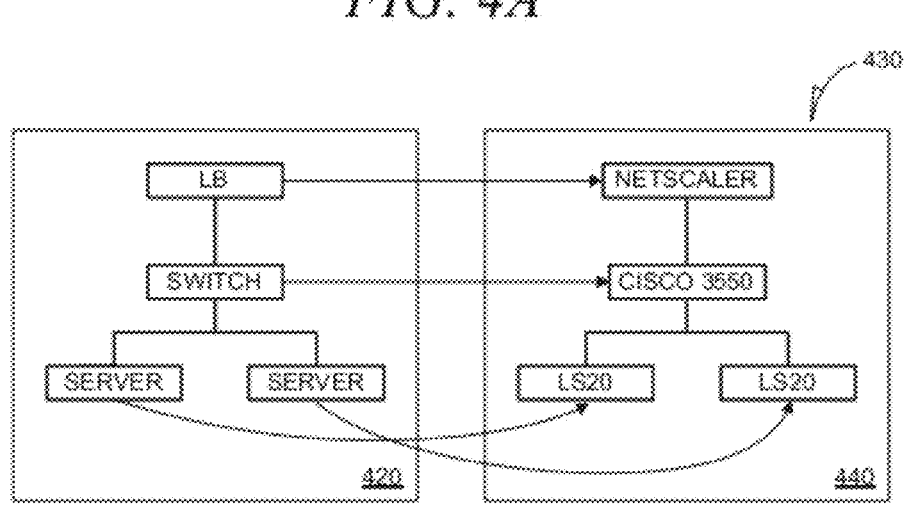
FIG. 4B is a block diagram of an example embodiment of a mapping of abstract resource types of the logical topology of FIG. 4A to physical resource types in a physical topology.

FIG. 4B shows a very simple example of a conceptual depiction 430 of a mapping of abstract resources in the logical topology 420 to physical resource types in the physical topology 440. In other words, when the physical topology 440 is created, the concrete types of resources are specified (e.g., server, which is an abstract type, is bound to an IBM® LS20, which is a concrete type).

Figure 4C:
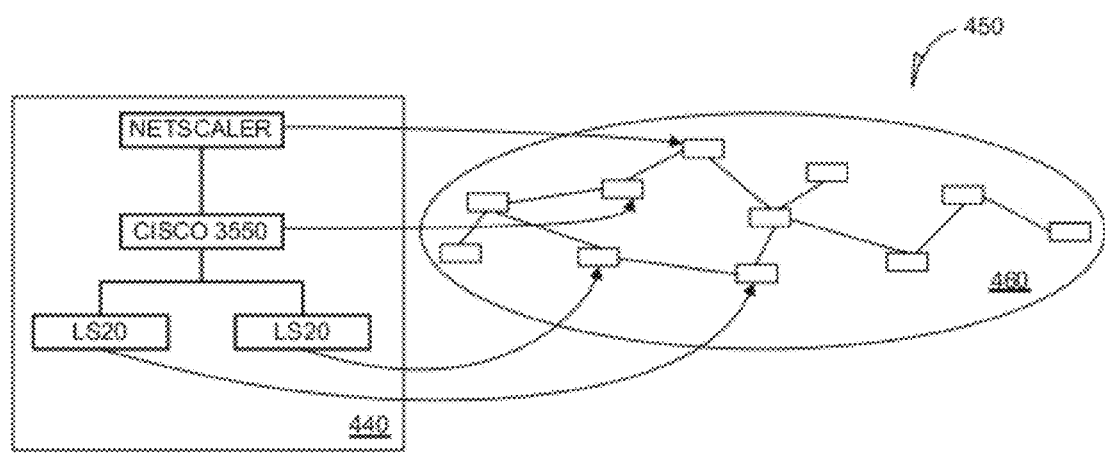
FIG. 4C is a block diagram of an example embodiment of a binding of the physical resource types of the physical topology of FIG. 4B to specific instances of physical resources in an infrastructure environment.

FIG. 4C shows a very simple example of a conceptual depiction 450 of a binding of physical resource types in the physical topology 440 to specific instances of physical resources in an infrastructure environment 460. For example, during a resource allocation phase, a specific instance of the IBM® LS20 in the infrastructure environment 460 is chosen, and the concrete type is bound to it. Although FIGS. 4A, 4B, and 4C show hardware resources, the same or similar concept is applicable for software and firmware resources and services. However, it should be noted that a second step in the binding process (binding to an instance of the software resource) may be done lazily. In this case, the binding happens after the software resource has been provisioned.

Flowcharts of Methods of OLCM and SLM

Figure 5A:
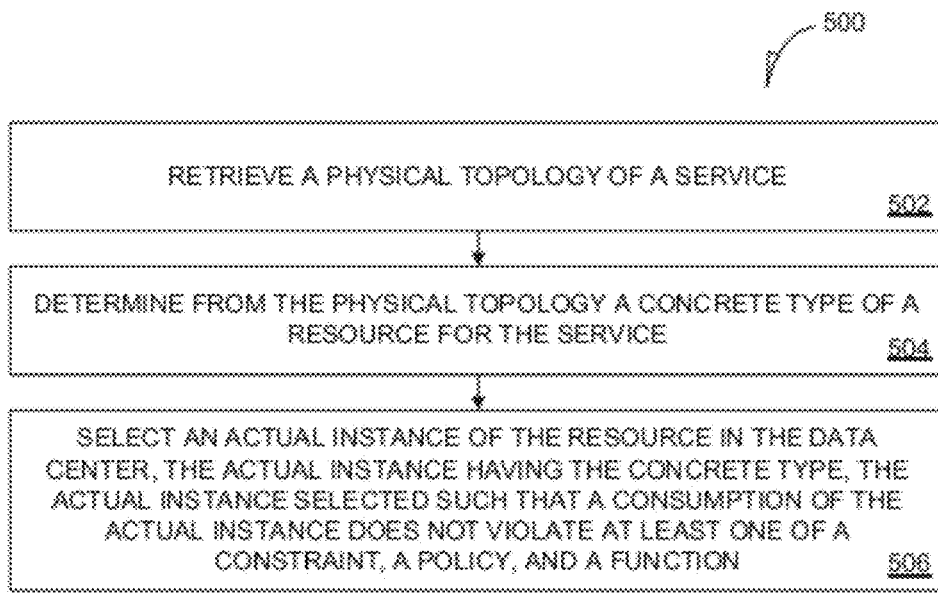
FIG. 5A is a flowchart of an example embodiment of a method to manage a data center, a cloud, or another infrastructure environment.

Referring now to FIG. 5A, a flowchart 500 of an example embodiment of a method of managing a data center, including a cloud or another infrastructure environment. The method includes retrieving 502 a physical topology of a service, determining 504 from the physical topology a concrete type of a resource for the service, and selecting 506 an actual instance of the resource in the data center, the actual instance having the concrete type, the actual instance selected such that a consumption of the actual instance does not violate at least one of a constraint and a policy. The constraint or the policy may be included in the policy repository.

Figure 5B:
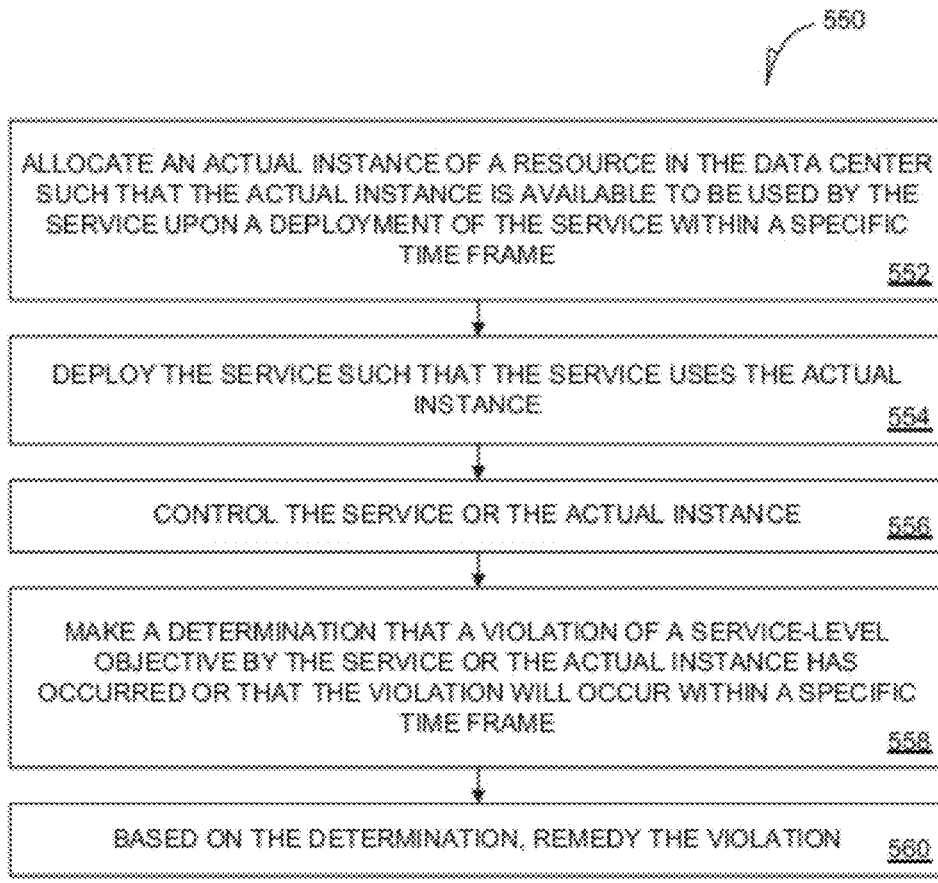
FIG. 5B is a flowchart of an example embodiment of the method of FIG. 5A, including additional optional steps.

FIG. 5B is a flowchart 550 of an example embodiment of the method of FIG. 5A, further comprising steps of allocating 552 an actual instance of a resource in the data center such that the actual instance is available to be used by the service upon a deployment of the service within a specific time frame, deploying 554 the service such that the service uses the actual instance, controlling 556 the service or the actual instance, making 558 a determination that a violation of a service-level objective by the service or the actual instance has occurred or that the violation will occur within a specific time frame, and based on the determination, remedying 560 the violation.

Figure 6:
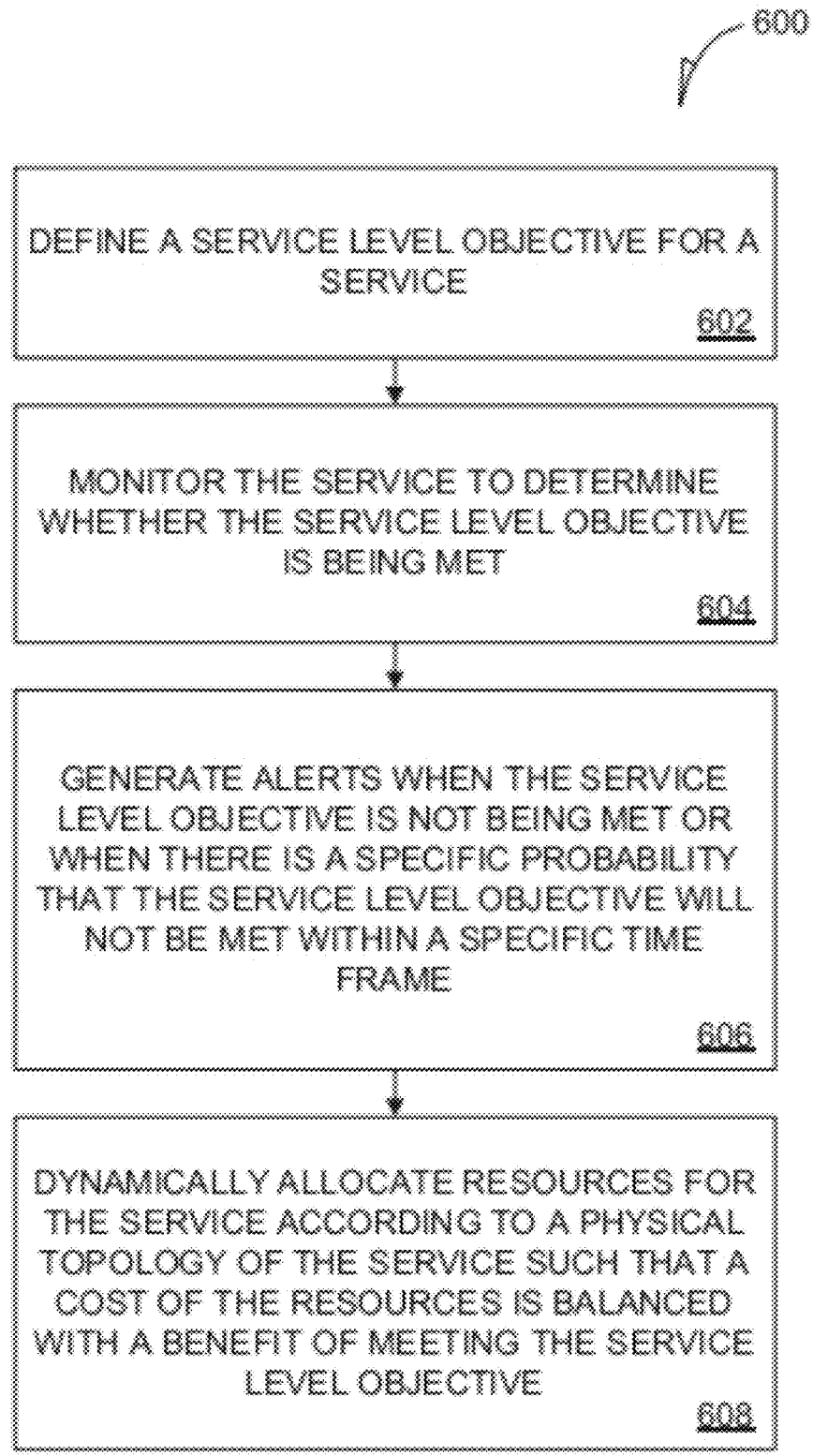
FIG. 6 is a flowchart of an example embodiment of the method of FIG. 5A, further comprising steps related to service level management (SLM)

FIG. 6 is a flowchart 600 of an example embodiment of the method of FIG. 5A, wherein the steps of making 558 a determination that a violation of a service-level objective by the service or the actual instance has occurred or that a violation will occur within a specific time frame, and based on the determination, remedying 560 the violation include defining 602 a service-level objective for a service, monitoring 604 the service to determine whether the service-level objective is being met, generating 606 alerts when the service-level objective is not being met or when there is a specific probability that the service-level objective will not be met within a specific time frame, and dynamically allocating 608 resources for the service according to a physical topology of the service such that a cost of the resources is balanced with a benefit of meeting the service-level objective of the service. The causes of the violation of the service-level objective may include, for example, increased load or failure of constituent (child) services and/or resources.

Figure 7:
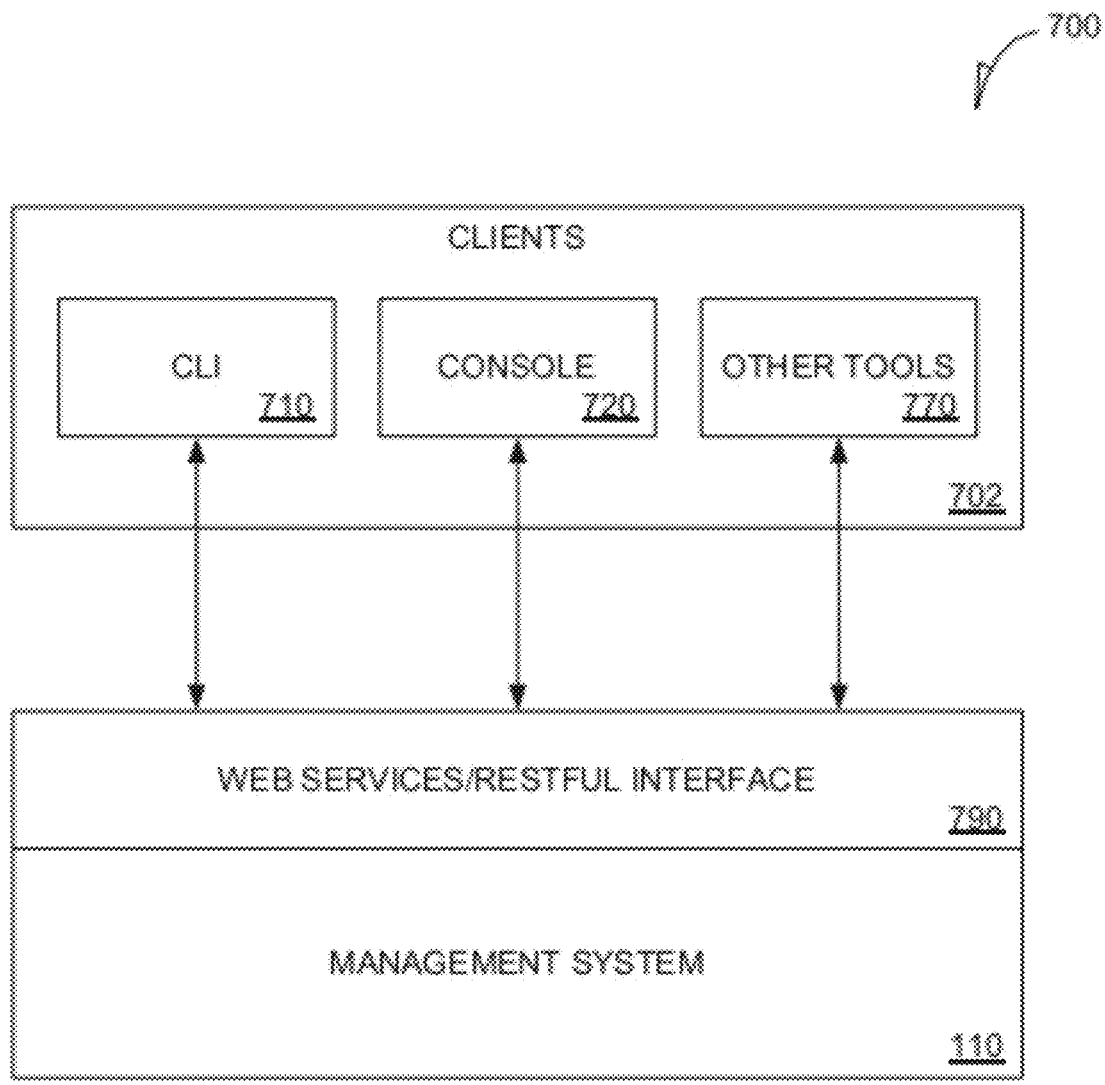
FIG. 7 is a block diagram of various clients that can communicate with an example embodiment of a management system, such as the management system of FIG. 1.

FIG. 7 is a block diagram 700 of an example embodiment of communication between various clients 702 and the management system 110. The various clients 702 may include a command-line interface (CLI) 710, a console 720, and other tools 770. The various clients 702 may use programmatic mechanisms, such as a web services or a RESTful interface 790, to communicate with the management system 110. The management system 110 may expose all or a subset of its functionalities to the various clients 702. Furthermore, each of the various clients 702 may, in turn, expose all or a subset of the functionalities of the management system 110, or all or a subset of the functionalities of the one of the various clients 702, to a user. Thus, an example representation of one of the various clients 702, such as the console 710, that shows only a subset of the functionalities of the management system 110 or the one of the various clients 702 being exposed should not necessarily be interpreted as limiting the capability of the management system 110 or the one of the various clients 702 to expose additional functionalities.

Figure 8A:
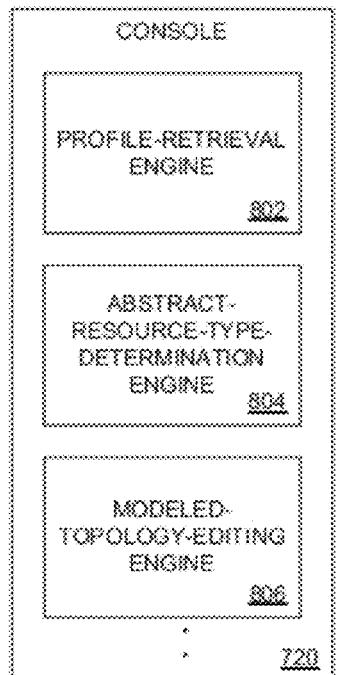
FIG. 8A is a block diagram of various hardware or software engines of an example embodiment of a console client of FIG. 7.

FIG. 8A is a block diagram of various hardware or software engines that comprise an example embodiment of the console 720 of FIG. 7. In FIG. 8A, the console 720 is shown to include a profile-retrieval engine 802, an abstract-resource-type-determination engine 804, and a modeled-topology-editing engine 806. In an example embodiment, any of the engines shown in FIG. 8A may be part of a freestanding application that can be started from or integrated into the console 720.

The profile-retrieval engine 802 retrieves a deployment profile ("profile") of a service. A deployment profile is a substantially complete specification for a deployment architecture of a service. The deployment architecture may include a given architecture domain (such as messaging, search, etc.). The deployment profile specifies entities such as the service itself, the resource types that the service consumes (such as application servers, compute servers, load balancers, etc.), their cardinalities, their configuration parameters, and their inter-relationships. This profile is then a model that is used to drive all subsequent operational lifecycle actions such as resource allocation, deployment, etc. It is expected that each architecture domain may have at least a few profiles. In an example embodiment, to facilitate development of profiles, a base information model, called base module, is provided that is common across all domains. The base module specifies, for example, compute, network, storage, IP address, virtual local-area network (VLAN), operating system, and application resources. To create a profile, a specific architecture domain, such as a messaging domain, leverages relevant aspects of the base module and will add domain-specific constructs. In an example embodiment, the profile is created in a Unified Modeling Language (UML) tool. To make the profile executable by a software program, the profile is transformed into an XML schema. In an example embodiment, clients such as a command-line interface, console, or other software tools can use programmatic mechanisms (for example, Web Services or RESTful approach) to communicate with the management system. These clients can provide a user interface for performing profile operations, such as creating, retrieving, updating, and deleting profiles. For example, in a specific example embodiment, MagicDraw is used as the UML tool and to transform the model to XML schema. In an example embodiment, profiles are built by systems or application architects with input from operations architects. Profiles may be created outside of the management system 110. Furthermore, the console 720 may include a profile-editing engine 872 that provides create, retrieve, update, and delete operations on profiles. Profile schemas (for example, XML profile schemas) may be stored in the management system 110.

The abstract-resource-type-determination engine 804 parses and interprets the schema of a deployment profile to determine the abstract resource types associated with a service. These abstract resource types may correspond to the nouns in the schema; for example, server, operating system, load balancer, layer 2 connections, etc.

The modeled-topology-editing engine 806 provides create, retrieve, update, and delete operations on logical topologies. Every service to be deployed may have an associated topology. A deployment topology ("topology") is a realization of the profile and as such specifies an actual type and number of resources consumed. The topology may have one of two types: logical (or modeled) and physical. The logical topology specifies the abstract types of resources used and their cardinalities. The logical topology thus does not have any bindings to actual physical resources. The advantage of separation between the logical topology and the physical topology is that the same logical topology can be deployed in different environments (at the same time or at different times) by binding to different resource types or instances. For example, the same logical topology can be deployed in a quality-assurance (QA) environment and later on in a production environment. As another example, the same logical topology can be deployed in an eBay data center and at a later time or simultaneously in either an internal or an external cloud. The console 720, through the modeled-topology-editing 826, may also provide a visual association between the logical topology and a related specification, namely, its profile. For example, the modeled-topology-editing engine 806 may present a representation of abstract types determined from the deployment profile. For example, the modeled-topology-editing engine 806 may dynamically populate a service and resource palette, such as service and resource palette 940 (see FIG. 9, discussed below), with the correct icons. These icons may correspond to the nouns in the schema; for example, server, operating system, load balancer, layer 2 connections, etc. The user may then be able to drag-and-drop one of these icons to add an instance of a resource of a particular type to a modeled topology of the service. In an example embodiment, the modeled-topology-editing engine 806 may be part of a freestanding application that can be started from or integrated into the console 720. In an example embodiment, both logical and physical topologies are intended to be built by operations or application architects. In an example embodiment, once created, a topology can be saved and versioned in the management system 110. Furthermore, the modeled-topology-editing engine 806 may include a safety state in which a topology cannot be deleted if a corresponding service is deployed.

Figure 8C:
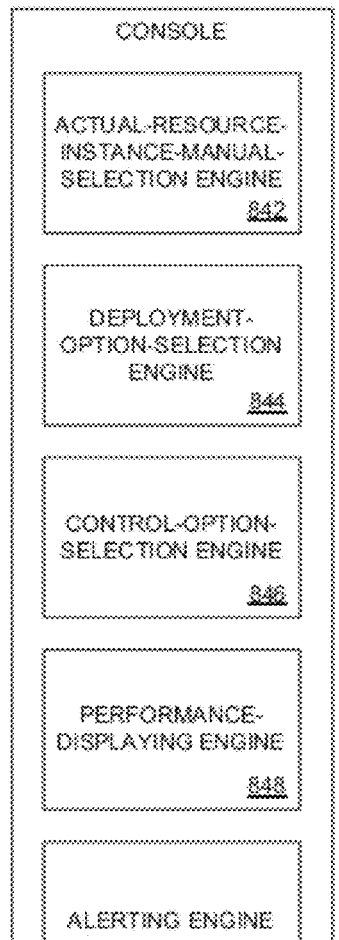
FIG. 8C is a block diagram of additional various hardware or software engines of an example embodiment of the console client of FIG. 7.
Figure 8D:
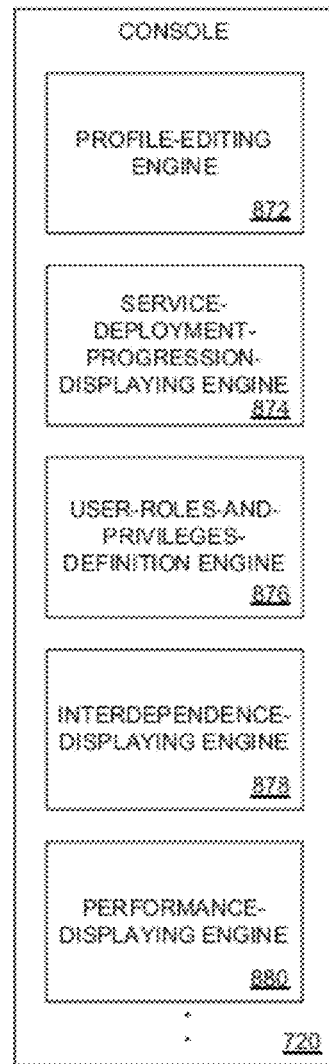
FIG. 8D is a block diagram of additional various hardware or software engines of an example embodiment of the console client of FIG. 7.
Figure 8B:
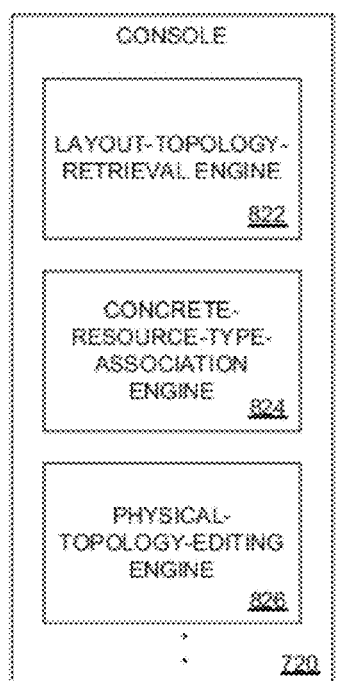
FIG. 8B is a block diagram of additional various hardware or software engines of an example embodiment of the console client of FIG. 7.

FIG. 8B is a block diagram of various hardware or software engines, in addition to the engines of FIG. 8A that comprise another example embodiment of the console 720 of FIG. 7. FIG. 8B is shown to include a layout-topology-retrieval engine 822, a concrete-resource-type-association engine 824, and a physical-topology-editing engine 826. In an example embodiment, any of the engines shown in FIG. 8B may be part of a freestanding application that can be started from or integrated into the console 720.

The layout-topology-retrieval engine 822 retrieves the topology of the data center, cloud, or another infrastructure environment. The topology of the data center may be retrieved from storage or directly from a server, such as the management system 110, through communication between the console 720 and the server.

The concrete-resource-type-association engine 824 analyzes the topology of the data center to determine concrete types of resources in the data center that may be associated with the abstract types of resources specified in the deployment profile or modeled topology of the service.

The physical-topology-editing engine 826 provides create, retrieve (i.e., read), update, delete, and save operations on physical topologies. Physical topologies may be created from logical topologies. A physical topology contains the binding from the abstract to the concrete types (e.g., a server, which is an abstract type, is bound to, for example, an IBM® LS20, which is a concrete type). The console 720, through the physical-topology-editing engine 826, may present a visual association between the two types of topologies (logical and physical) of a service such that a user can navigate from the logical topology to the physical topology and vice-versa. The console 720, through the physical-topology-editing engine 826, may also provide a visual association between the topology (either logical or physical) and a related specification, namely, its profile. Furthermore, the physical-topology-editing engine 826 may include a safety state in which a topology cannot be deleted if a corresponding service is deployed.

FIG. 8C is a block diagram of various hardware or software engines, in addition to the engines of FIG. 8A or FIG. 8B that comprise another example embodiment of the console 720 of FIG. 7. FIG. 8C is shown to include an actual-resource-instance-manual-selection engine 842, a deployment-option-selection engine 844, a control-option selection engine 846, an alerting engine 848, and a perspective-displaying engine 850. In an example embodiment, any of the engines shown in FIG. 8C may be part of a freestanding application that can be started from or integrated into the console 720.

The actual-resource-instance-manual-selection engine 842 presents available and relevant concrete resources types in an infrastructure environment for selection by the user to add physical instances of resources having particular concrete types to the physical topology of the service. Recall that a physical topology is one in which a binding is first created between the abstract type and the concrete type, and then between the concrete type and the actual instance in the infrastructure. The former activity is the one that happens during the resource selection phase. If the selection is done manually, the console 720, through the actual-resource-instance-manual-selection engine 842, provides a means, perhaps visual (for example, using the physical resource type binding view 1000 of FIG. 10, discussed below), to bind an abstract type to a concrete type. Thus, the console 720, actual-resource-instance-manual-selection engine 842, may present available and relevant resources types in an infrastructure environment, such as a data center, either in a tabular manner or graphically (for example, by showing the concrete types).

The deployment-option-selection engine 844 provides navigation capabilities to a user to select an appropriate topology to be deployed. Once a deploy command is issued, the console 720 may send the relevant topology information to a dispatcher, such as the dispatcher 256 (see FIG. 2), which then dispatches the deploy command to an appropriate service manager, such as one of service managers 230. With reference again to FIG. 2, the appropriate one of service managers 230 first performs a dry run. The results of this operation are sent back to the console 720, which, through the deployment-option-selection engine 844, interprets the results and visually marks the resources or services in the topology that are going to be affected. The console 720 provides a capability to the user to "inspect" each resource or service to see the specific task(s) that will be performed on a particular entity. The submission of a deploy command may result in a job creation; the console 720, through the deployment-option-selection engine 844, depicts this information as well. Once the user gives the final approval for deployment, the console 720 sends this information to the management system 110, which may then proceed with the actual deployment.

The control-option selection engine 846 provides capabilities to issue control actions such as start, stop, activate, deactivate, and so on with reference to an individual resource or service or groups thereof. Each action results in the creation of a job, execution of a dry run (by default), and then subsequent execution of the constituent tasks in the job. As such, the presentation aspects are similar to those in a deployment view described below.

The alerting engine 848 presents color-coded markers in context with a displayed topology. For example, a green marker associated with a service or resource indicates all relevant KPIs are within an expected range, an amber marker indicates there is cause for some concern, and red indicates failure or an SLO violation. Using visual indicators in context provides a mechanism for operations personnel to quickly determine if there is a problem, and if so, the chance of propagation of problem to other resources or services.

The perspective-displaying engine 850 provides at least three perspectives: (a) service; (b) resource; and (c) business. The perspectives may be crosscutting across the various views. Further, there may be navigability between the perspectives, especially between services and resources. The navigability is feasible because of a single underlying model; each view is a projection of the single model. In an example embodiment, in a monitoring view, a user can just look at a service's performance, and then can choose to observe the performance of resources used by that service. Similarly, the user can view the various deployed resources, choose one of them, query the system to present all services using that resource, and then navigate to one of the services. In a similar fashion, service-to-resource navigability can be performed. Thus, this capability may provide an insight into an infrastructure.

FIG. 8D is a block diagram of various hardware or software engines, in addition to the engines of FIG. 8A, FIG. 8B, or FIG. 8C, that comprise another example embodiment of the console 720 of FIG. 7. FIG. 8D is shown to include a profile-editing engine 872, a service-deployment-progression-displaying engine 874, a user-roles-and-privileges-definition engine 876, an interdependence-displaying engine 878, and a performance-displaying engine 880. In an example embodiment, any of the engines shown in FIG. 8D may be part of a freestanding application that can be started from or integrated into the console 720.

The profile-editing engine 872 provides views to perform create (save), retrieve, update, and deletion operations on profiles. Profiles may be scoped under an architecture domain, such as a messaging or search architecture domain, to provide a visual grouping mechanism for profiles. Furthermore, each profile version may be linked with topologies associated with that version. The profile-editing engine 872 may include a safety state in which a profile cannot be deleted if a corresponding service is deployed.

The service-deployment-progression-displaying engine 874 displays, for each deployment task, status and progress updates that the Console 720 may receive, perhaps in a periodic or asynchronous manner, from a server, such as management system 110. The service-deployment-progression-displaying engine 874 may superpose this information on the corresponding resource in the displayed topology. The superposed information may provide a simple yet very useful indication of the overall progress and impact of the deployment operation. A user can, of course, log out and log in much later to check on the deployment status. The console 720, through the service-deployment-progression-displaying engine 874, may provide navigability from the job in the view (which provides a summary of the progress and status) to a graphical depiction of a topology with superposed progress and status updates. In an example embodiment, once the deployment finishes (with success or failure), the results are displayed and the job status is updated.

The user-roles-and-privileges-definition engine 876 controls the presentation of views in the console such that those views correspond to user roles and privileges. As described above with reference to FIG. 2, authentication and authorization operations are performed by the dispatcher 256. When the authentication and authorization operations succeed, the dispatcher 256 may return known user roles and associated privileges to the console 720. The console 720, using the user-roles-and-privileges-definition engine 876, can then present those views that correspond to the returned user roles and privileges. For example, the console 720 may allow a user with an operations architect role to assemble a topology, but not deploy it. That is, the console 720, through the user-roles-and-privileges-definition engine 876, may present a topology-designing view, but not a deployment view, to a user belonging to the operations architect role.

The interdependence-displaying engine 878 provides a view into the structure of the various services and resources that the management system manages. The view may show dependencies between services, dependencies between resources, and dependencies between services and resources.

The performance-displaying engine 880 provides a monitoring dashboard that presents, for example, charts or graphs of various performance metrics. The user can customize the view to observe the metrics and charts of interest. The console 720, using the performance-displaying engine 880, may also present a summary of performance information.

Figure 9:
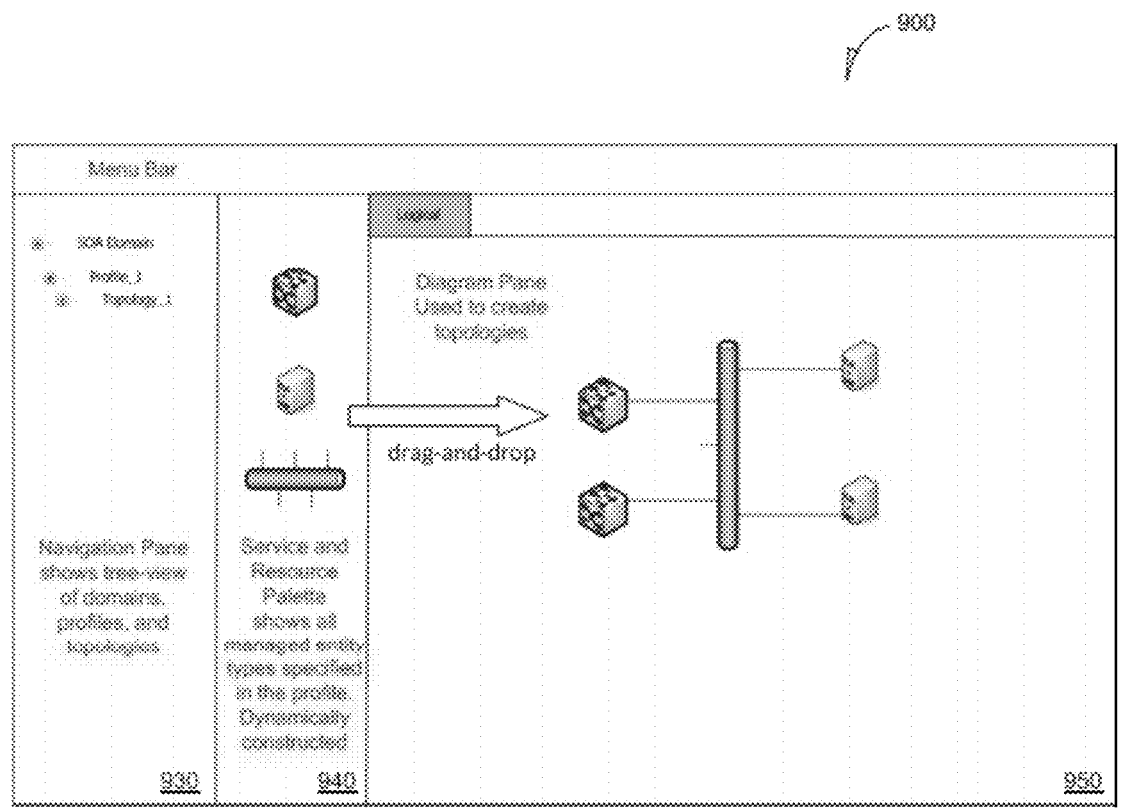
FIG. 9 shows a logical topology-editing view presented by an example embodiment of the topology-editing interface engine of FIG. 8.

FIG. 9 shows a logical topology-editing view 900 presented by an example embodiment of the modeled-topology-editing engine 806, which allows for creation, editing, and resource binding of topologies. A navigation pane 930 shows a tree-view of architecture domains, profiles, and topologies. To create a logical topology, which happens in an assembly phase, the modeled-topology-editing-engine 806 may retrieve the user-specified profile from a backend (e.g., management system 110 of FIG. 7), parse and interpret the schema, and dynamically populate a service and resource palette 940 with the correct icons. These icons may correspond to the nouns in the schema; for example, server, operating system, load balancer, layer 2 connections, etc. The modeled-topology-editing engine 806 presents abstractions and representations of these nouns that are meaningful for the target user population (in this case, the users will typically be the operations architects). The user can drag and drop the icons on to the diagram pane 950, and can create connections between them thus building a topology. The modeled-topology-editing engine 806 understands the connectivity rules and constraints as specified in the profile (schema), and enforces them during the topology building activity. For example, a profile may specify that a server can be connected to a switch but not to another server. As another example, if a profile specifies that a service can have up to 10 servers, the modeled-topology-editing engine 806 may prevent the user from adding 11 servers to the topology. During building of a topology, configuration information for various entities needs to be provided.

Figure 10:
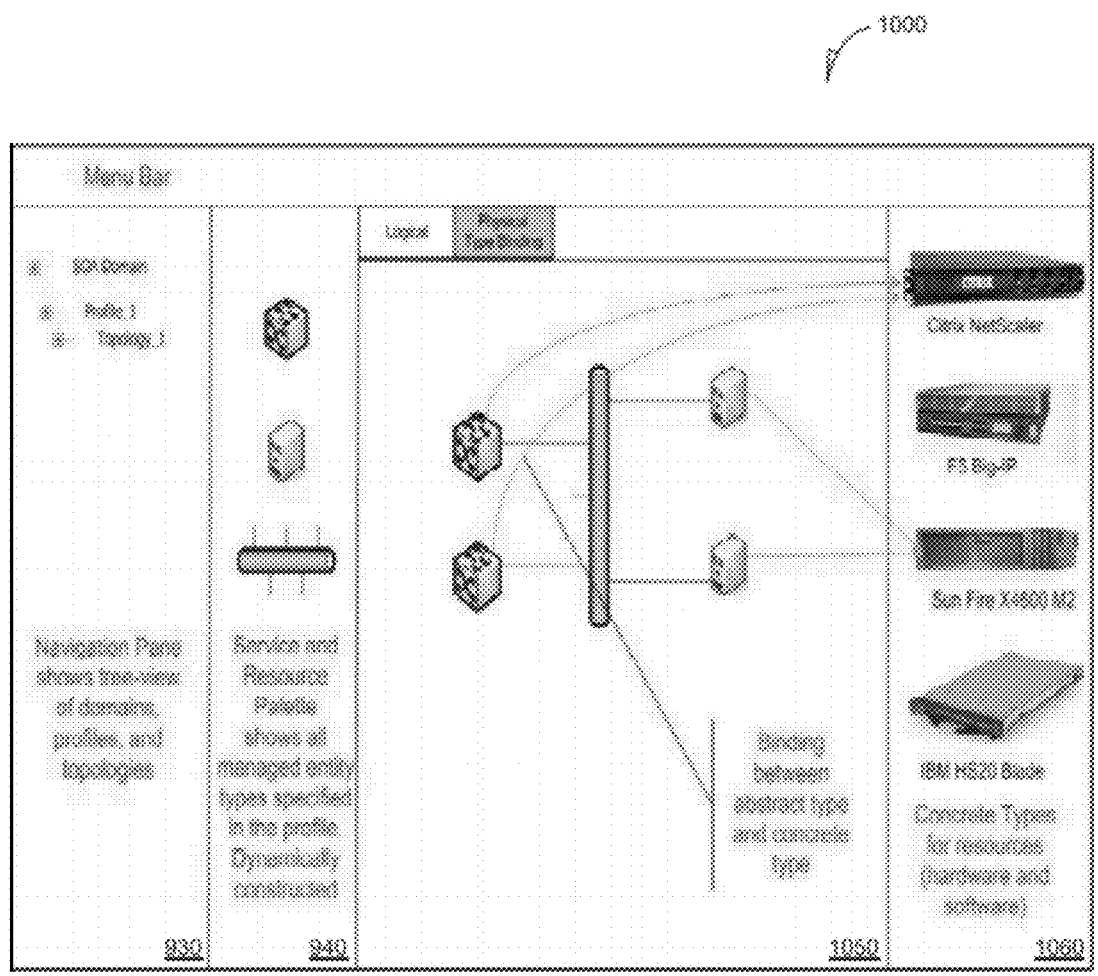
FIG. 10 shows a physical resource type binding view presented by an example embodiment of the topology-editing interface engine of FIG. 8.

FIG. 10 shows a physical resource type binding view 1000 presented by an example embodiment of the physical-topology-editing engine 826 of FIG. 8. To create the physical topology (which happens in the assembly phase), the physical-topology-editing engine 826 presents the available concrete types for the resources in the concrete types pane 1060. The user can then manually bind the abstract types in the topology to the concrete types thereby creating the physical topology. For example, the user may be presented with two choices each for the abstract types of the load balancer and server. The user may then choose, for example, a Citrix® NetScaler® as the load balancer and a Sun Microsystems® Fire X4600 M2 as the server. Although not shown in FIG. 10, bindings may also be performed for software resources and services. When the user wants to commit a topology, the editor creates an XML instance document representing the topology and conforming to the profile (schema). To preserve the layout information in a physical type binding diagram pane 1050 such that a subsequent open of the topology shows the layout that the user last saved, the physical-topology-editing engine 826 also generates an XML instance document that conforms to a layout schema. (GraphML is one choice that may be used to represent the layout.) The physical-topology-editing engine 826 then sends both XML instance documents to the backend.

Both the modeled-topology-editing engine 806 and the physical-topology-editing engine 826 support editing of configuration information for individual entities as well as for groups of entities. For example, most of the configuration information for a server is usually the same, and instead of forcing the user to enter it for each server, the user can enter it once and the modeled-topology-editing engine 806 can apply the configuration information to a group of servers as selected by the user. The modeled-topology-editing engine 806 and the physical-topology-editing engine 826 are also capable of presenting hierarchical structure. For example, a server icon, when double clicked, shows the constituent parts such as Ethernet ports, disks, and so on. Similarly, a service icon, when double clicked, shows the constituent resources. Most topologies may be quite large, for example, they may easily contain hundreds of servers. The modeled-topology-editing engine 806 and the physical-topology-editing engine 826 provide abstractions that enable ease of use of creating and modifying such topologies, for example, by using clustering techniques. Instead of starting from a profile and creating a topology, the user can select a particular version of the topology and choose to modify it instead. The modeled-topology-editing engine 806 and the physical-topology-editing engine 826 allow the proper abstractions or operations to enable this action.

Figure 11:
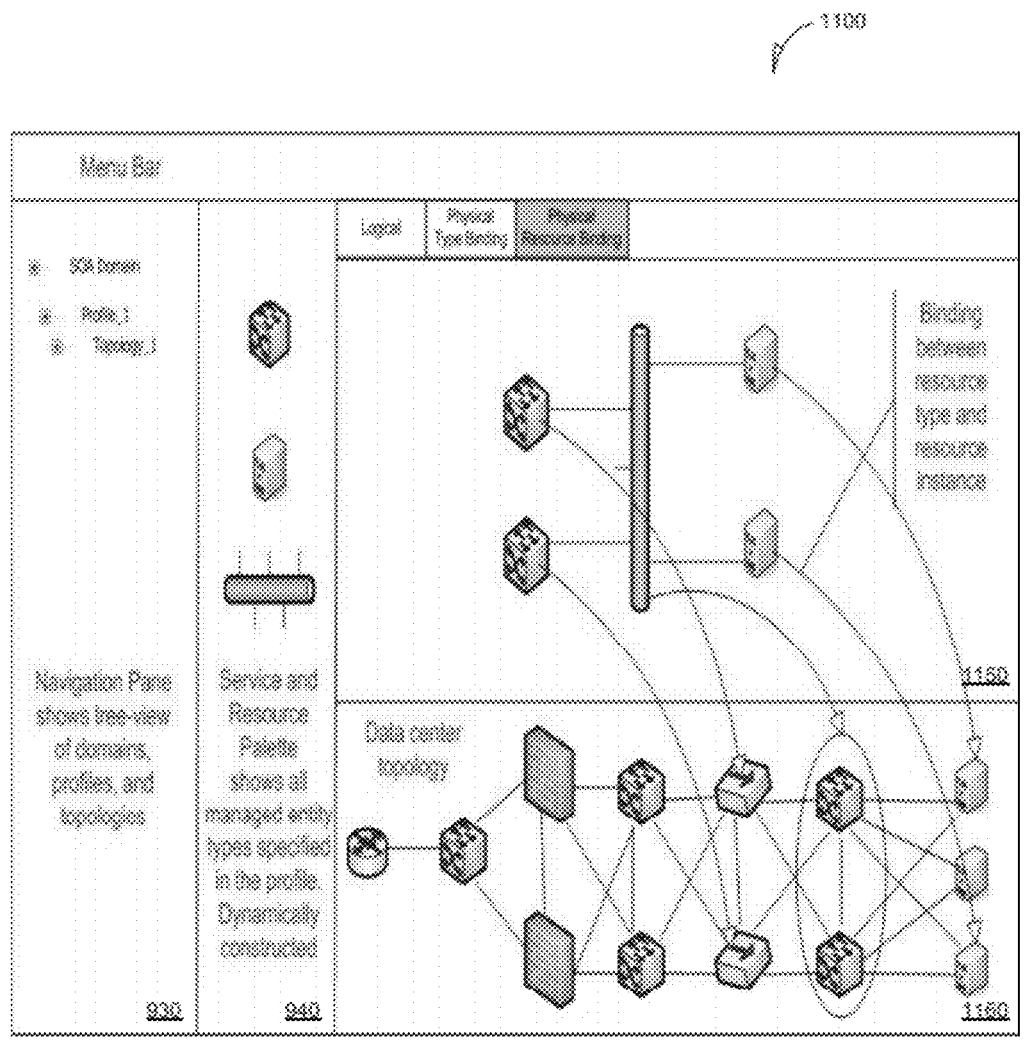
FIG. 11 shows a physical resource binding view presented by an example embodiment of the topology-editing interface engine of FIG. 8.

FIG. 11 shows a physical resource binding view 1100 presented as an example embodiment of the actual-resource-instance-manual-selection engine 842 of FIG. 8. During the resource allocation phase, if the process is done manually, the actual-resource-instance-manual-selection engine 842 is used to bind the concrete types in the physical topology to the resource instances in the infrastructure. To do so, the actual-resource-instance-manual-selection engine 842 retrieves the relevant data center topology (e.g., from the backend), including existing physical resources, filters out the non-applicable resources (for example, those resources that do not have enough capacity or do not meet capability requirements), and presents likely candidates in a data center topology pane 1160. For example, if resources of a particular type are required, the actual-resource-instance-manual-selection engine 842 may display only resources of that type. As another example, if two dual-core CPUs are required, the modeled-topology-editing engine 806 may display only servers having two dual-core CPUs (or better). That is, the actual-resource-instance-manual-selection engine 842 may display only those resources that can provide the capability that a particular service or physical element of that service (e.g., a load balancer) requires, thus providing a matchmaking functionality. As another example, the actual-resource-instance-manual-selection engine 842 may display only those resources that are in a particular data center or a particular geographic area, thus providing geographic filtering. As another example, the actual-resource-instance-manual-selection engine 842 may filter out physical resources that are no longer applicable based on user selections (for example, after a user selects a particular switch or layer 2 fabric, the actual-resource-instance-manual-selection engine 842 may filter out all of those resources that do not use the selected switch or layer 2 fabric). The actual-resource-instance-manual-selection engine 842 provides a visual binding capability that the user can use to bind the resource types, as presented in a resource type pane 1150, to resource instances in the data center, as presented in the data center topology pane 1160. Once all the necessary bindings are made, the physical topology is saved whereupon the actual-resource-instance-manual-selection engine 842 generates the topology and layout XML instance documents and commits them to the backend.

Flowcharts of Methods of Managing a Data Center Through a Console

Figure 12A:
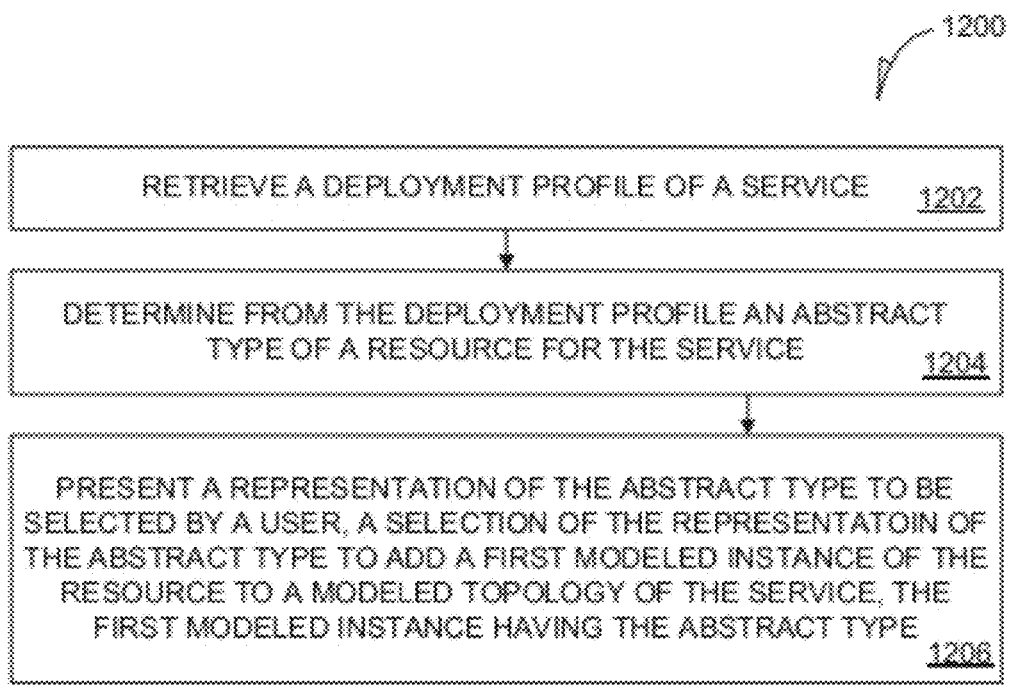
FIG. 12A is a flowchart of an example embodiment of a method of managing a data center.

FIG. 12A is a flowchart 1200 of an example embodiment of a method of managing a data center through a console. The method includes retrieving 1202 a deployment profile of a service, determining 1204 from the deployment profile an abstract type of a resource for the service, and presenting 1206 a representation of the abstract type to be selected by a user, a selection of the representation of the abstract type to add a first modeled instance of the resource to a modeled topology of the service, the first modeled instance having the abstract type.

Figure 12B:
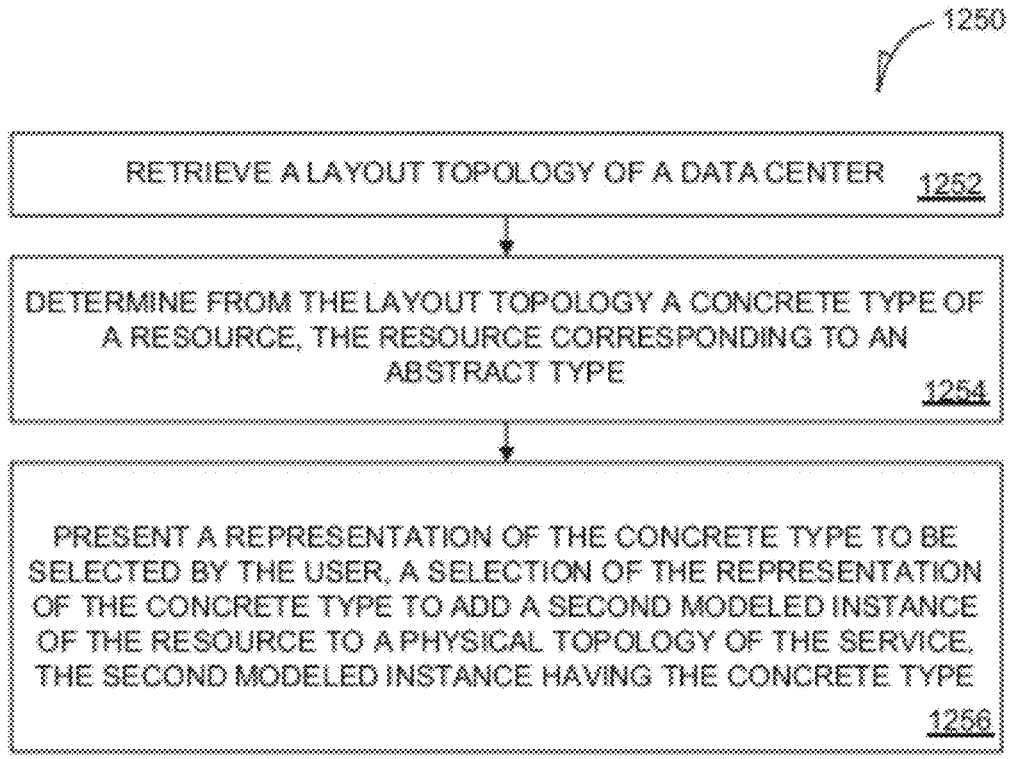
FIG. 12B is a flowchart of an example embodiment of the method of FIG. 12A, further including additional optional steps.

FIG. 12B is a flowchart 1250 of an example embodiment of the method of FIG. 12B, the method further comprising retrieving 1252 a layout topology of the data center; determining 1254 from the layout topology a concrete type of the resource, the concrete type corresponding to the abstract type; and presenting 1256 a representation of the concrete type to be selected by the user, a selection of the representation of the concrete type to add a second modeled instance of the resource to a physical topology of the service, the second modeled instance having the concrete type.

Figure 13:
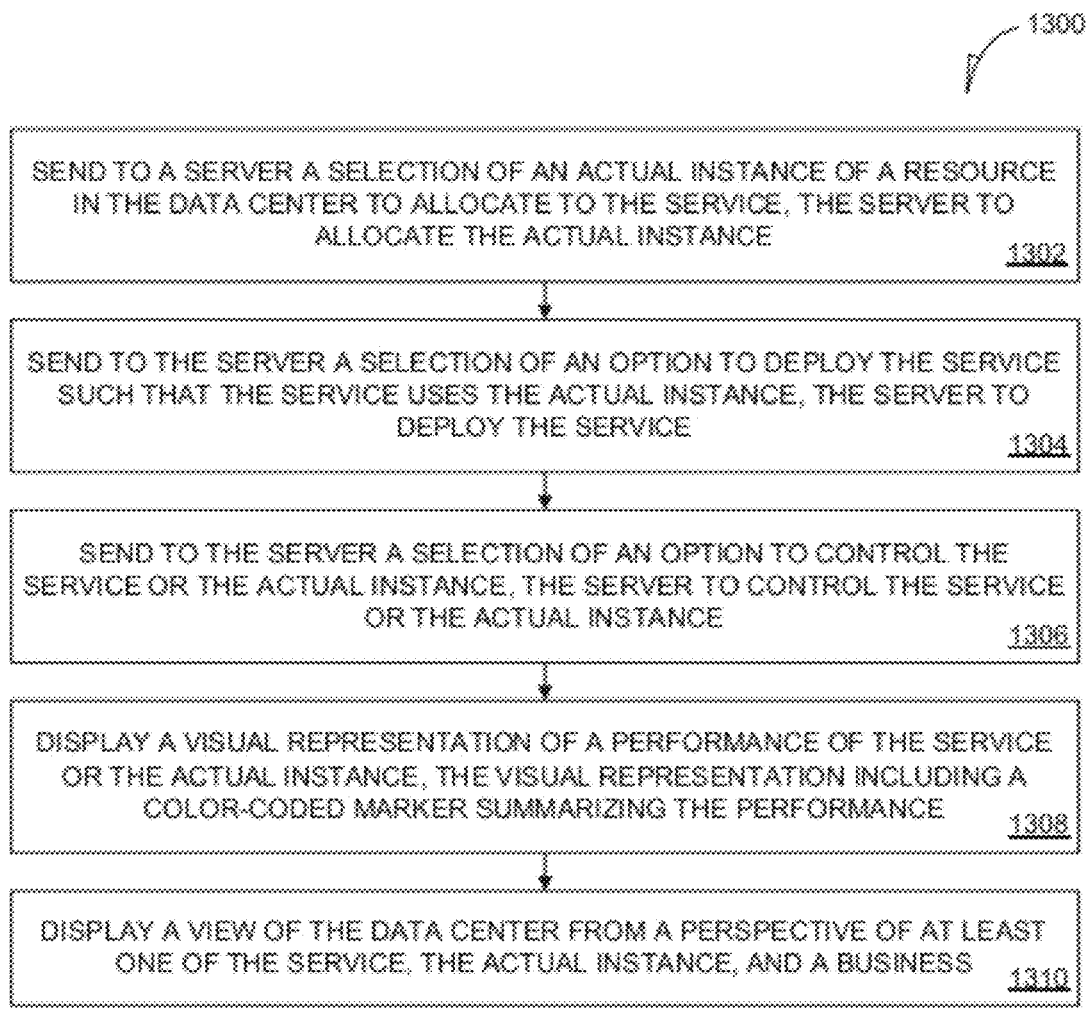
FIG. 13 is a flowchart of another example embodiment of the method of FIG. 12A or FIG. 12B, further including additional optional steps.

FIG. 13 is a flowchart 1300 of an example embodiment of the method of FIG. 12A or FIG. 12B, further comprising sending 1302 to a server a selection of an actual instance of the resource in the data center to allocate to the service, the server to allocate the actual instance; sending 1304 to a server a selection of an option to deploy the service such that the service uses an actual instance of the resource in the data center, the server to deploy the service; sending 1306 to a server a selection of an option to control the service or an actual instance of the resource in the data center, the server to control the service or the actual instance; displaying 1308 a visual representation of a performance of the service or an actual instance of the resource in the data center, the visual representation including a color-coded marker summarizing the performance; and displaying 1310 a view of the data center from a perspective of at least one of the service, an actual instance of the resource in the data center, and a business.

Engines, Components, and Logic

Certain embodiments described herein may be implemented as logic or a number of engines, components, or mechanisms. An engine, logic, component, or mechanism (collectively referred to as an "engine") may be a tangible unit capable of performing certain operations and is configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as an engine that operates to perform certain operations described herein.

In various embodiments, an engine may be implemented mechanically or electronically. For example, an engine may comprise dedicated circuitry or logic that is permanently configured (e.g., within a special-purpose processor) to perform certain operations. An engine may also comprise programmable logic or circuitry (e.g., as encompassed within a general-purpose processor or other programmable processor) that is temporarily configured by software or firmware to perform certain operations. It will be appreciated that a decision to implement an engine mechanically, in the dedicated and permanently configured circuitry, or in temporarily configured circuitry (e.g., configured by software) may be driven by cost and time considerations.

Accordingly, the term engine should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which engines or components are temporarily configured (e.g., programmed), each of the engines or components need not be configured or instantiated at any one instance in time. For example, where the engines or components comprise a general-purpose processor configured using software, the general-purpose processor may be configured as respective different engines at different times. Software may accordingly configure the processor to constitute a particular engine at one instance of time and to constitute a different engine at a different instance of time.

Engines can provide information to, and receive information from, other engines. Accordingly, the described engines may be regarded as being communicatively coupled. Where multiples of such engines exist contemporaneously, communications may be achieved through signal transmission (e.g., over appropriate circuits and buses) that connect the engines. In embodiments in which multiple engines are configured or instantiated at different times, communications between such engines may be achieved, for example, through the storage and retrieval of information in memory structures to which the multiple engines have access. For example, one engine may perform an operation, and store the output of that operation in a memory device to which it is communicatively coupled. A further engine may then, at a later time, access the memory device to retrieve and process the stored output. Engines may also initiate communications with input or output devices and can operate on a resource (e.g., a collection of information).

Electronic Apparatus and System

Example embodiments may be implemented in analog, digital, or hybrid electronic circuitry, or in computer hardware, firmware, software, or in combinations thereof. Example embodiments may be implemented using a computer program product, for example, a computer program tangibly embodied in an information carrier (e.g., in a machine-readable medium for execution by, or to control the operation of, data processing apparatus, for example, a programmable processor, a computer, or multiple computers).

A computer program can be written in any form of programming language, including compiled or interpreted languages, and it can be deployed in any form, including as a stand-alone program or as an engine, component, subroutine, or other unit suitable for use in a computing environment. A computer program can be deployed to be executed on one computer or on multiple computers at one site or distributed across multiple sites and interconnected by a communication network.

In certain example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Figure 14:
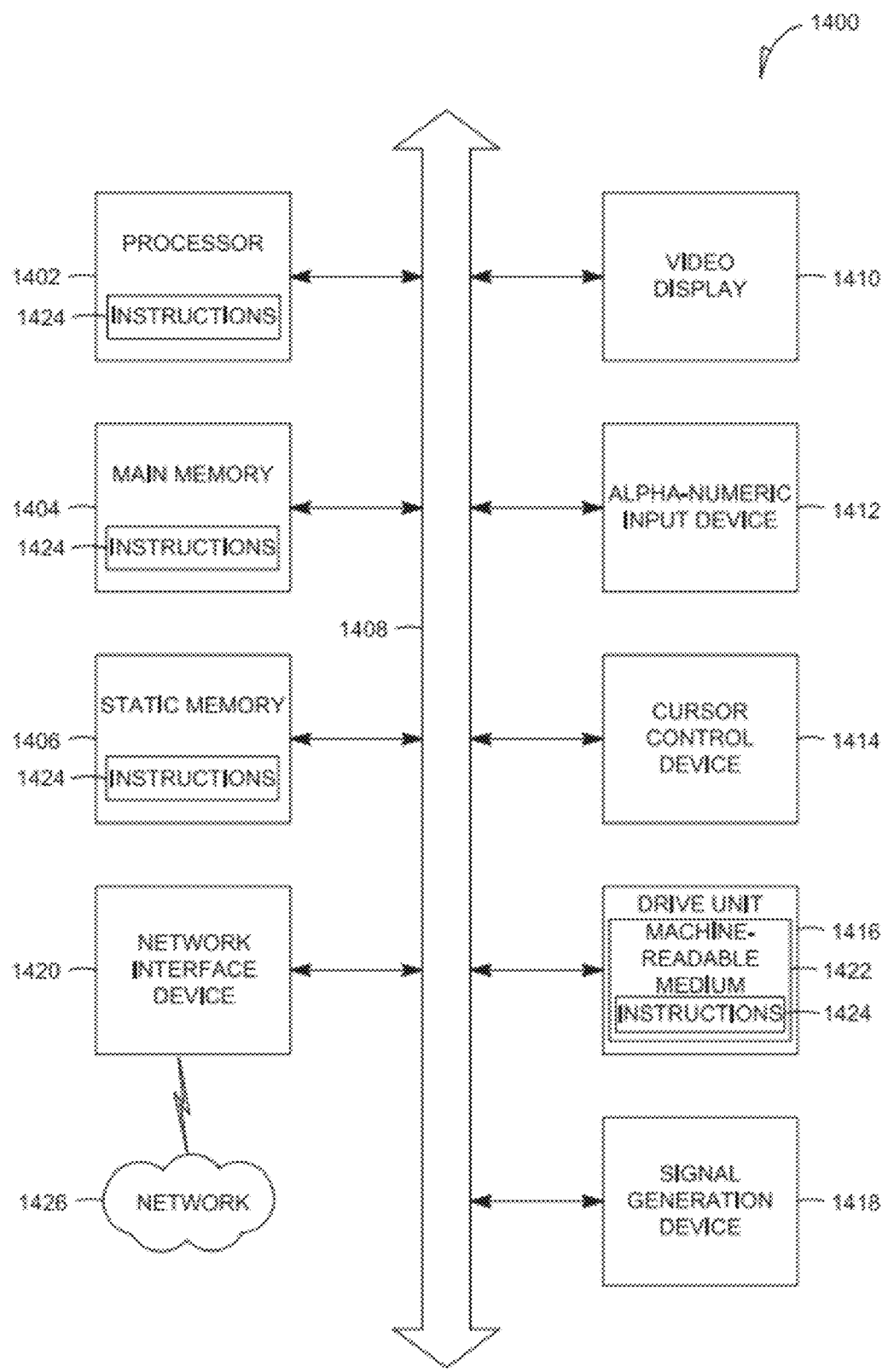
FIG. 14 is a block diagram of a machine-readable medium on which an example embodiment of the management system may be executed.

FIG. 14 shows a diagrammatic representation of a machine in the example form of a computer system 1400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 is shown to include a processor 1402 (e.g., a central processing unit (CPU), a graphics processing unit (GPU), or both), a main memory 1404, and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker), and a network interface device 1420.

The disk drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 or within the processor 1402 during execution thereof by the computer system 1400, the main memory 1404, and the processor 1402 also constituting machine-readable media.

The software 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to manage services have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The problem of allowing a user to manage in a systematic and cohesive manner one or more services or resources in a data center, a cloud, or another infrastructure environment is solved by various example embodiments, such as presenting a user interface to control a management system, the user interface presenting elements to allow the user to design a deployment profile of a service, assemble a modeled deployment topology of the service based on the deployment profile, and assemble a physical topology of the service based on the modeled deployment topology.

What is claimed is:

1. A system comprising:
    a profile-editing engine implemented by at least one processor and configured to:
        present a graphical representation of an abstraction of a resource that is to be used by a service;
        detect a selection of the graphical representation of the abstraction of the resource;
        based on the detecting of the selection, identify a concrete type of a resource in a data center that correspond to the abstraction of the resource and present a graphical representation of the concrete type of the resource;
        detect a manipulation of the graphical representation of the abstraction of the resource with respect to the graphical representation of the concrete type of the resource; and
        based on the detecting of the manipulation, map the abstraction of the resource to the concrete type of the resource in the data center.

2. The system of claim 1, the profile-editing engine further configured to:
    identify an actual instance of a resource in the data center that corresponds to the concrete type of the resource in the data center;
    present a graphical representation of the actual instance of the resource;
    detect a handling of the graphical representation of the concrete type of the resource with respect to the graphical representation of the actual instance of the resource; and
    based on the detecting of the handling, map the concrete type of the resource to the actual instance of the resource.

3. The system of claim 2, the profile-editing engine further configured to perform the identifying of the actual instance based on a filtering of a plurality of actual instances of resources in the data center that correspond to the concrete type of the resource in the data center.

4. The system of claim 1, the profile-editing engine further configured to perform the identifying of the concrete type of the resource based on a filtering of a plurality of concrete resource types in the data center that correspond to the abstraction of the resource.

5. The system of claim 3, wherein the filtering is based on a geographical region of the plurality of actual instances of the resources and a geographical region of the service.

6. The system of claim 1, the profile-editing engine further configured to communicate the mapping to a resource management system to reconfigure a deployment of the service in the data center.

7. A method comprising:
    presenting a graphical representation of an abstraction of a resource that is to be used by a service;
    detecting a selection of the graphical representation of the abstraction of the resource;
    based on the detecting of the selection, identifying a concrete type of a resource in a data center that corresponds to the abstraction of the resource and presenting a graphical representation of the concrete type of the resource;
    detecting a manipulation of the graphical representation of the abstraction of the resource with respect to the graphical representation of the concrete type of the resource; and based on the detecting of the manipulation, mapping the abstraction of the resource to the concrete type of the resource in the data center.

8. The method of claim 7, further comprising:

identifying an actual instance of a resource in the data center that corresponds to the concrete type of the resource in the data center;

presenting a graphical representation of the actual instance of the resource;

detecting a handling of the graphical representation of the concrete type of the resource with respect to the graphical representation of the actual instance of the resource; and based on the detecting of the handling, mapping the concrete type of the resource to the actual instance of the resource.

9. The method of claim 8, further comprising performing the identifying of the actual instance based on a filtering of a plurality of actual instances of resources in the data center that correspond to the abstraction of the resource.

10. The method of claim 7, further comprising performing the identifying of the concrete type of the resource based on a filtering of a plurality of concrete resource types that correspond to the abstraction of the resource.

11. The method of claim 9, wherein the filtering is based on a geographical region of the plurality actual instances of the resources and a geographical region of the service.

12. The method of claim 7, further comprising communicating the mapping to a resource management system to reconfigure a deployment of the service in the data center.

13. A non-transitory machine-readable storage medium storing a set of instructions that, when executed by at least one processor, causes the at least one processor to perform operations including:

presenting a graphical representation of an abstraction of a resource that is to be used by a service;

detecting a selection of the graphical representation of the abstraction of the resource;

based on the detecting of the selection, identifying a concrete type of a resource in a data center that corresponds to the abstraction of the resource and presenting a graphical representation of the concrete type of the resource;

detecting a manipulation of the graphical representation of the abstraction of the resource with respect to the graphical representation of the concrete type of the resource; and based on the detecting of the manipulation, mapping the abstraction of the resource to the concrete type of the resource in the data center.

14. The non-transitory machine-readable storage medium of claim 13, the operations further including:

identifying an actual instance of a resource in the data center that corresponds to the concrete type of the resource in the data center;

presenting a graphical representation of the actual instance of the resource;

detecting a handling of the graphical representation of the concrete type of the resource with respect to the graphical representation of the actual instance of the resource; and based on the detecting of the handling, mapping the concrete type of the resource to the actual instance of the resource.

15. The non-transitory machine-readable storage medium of claim 14, the operations further including performing the identifying of the actual instance based on a filtering of a plurality of actual instances of resources in the data center that correspond to the abstraction of the resource.

16. The non-transitory machine-readable storage medium of claim 13, the operations further including performing the identifying of the concrete type of the resource based on a filtering of a plurality of concrete resource types that correspond to the abstraction of the resource.

17. The non-transitory machine-readable storage medium of claim 15, wherein the filtering is based on a geographical region of the plurality of actual instances of the resources and a geographical region of the service.

* * * * *

UNITED STATES PATENT AND TRADEMARK OFFICE
CERTIFICATE OF CORRECTION

PATENT NO. : 8,316,305 B2  
APPLICATION NO. : 13/341778  
DATED : November 20, 2012  
INVENTOR(S) : Devendra R. Jaisinghani It is certified that error appears in the above-identified patent and that said Letters Patent is hereby corrected as shown below:

On The Title Page, Item (56)

On page 2, in column 1, under "Other Publications", line 2, delete "12." and insert --12 pgs.--, therefor On page 2, in column 1, under "Other Publications", line 3, delete "PCT/US2010/044015,Search" and insert --PCT/US2010/044015, Search--, therefor On page 2, in column 1, under "Other Publications", line 4, delete "12." and insert --12 pgs.--, therefor On page 2, in column 2, under "Other Publications", line 2, delete "14." and insert --14 pgs.--, therefor On page 2, in column 2, under "Other Publications", line 4, delete "14." and insert --14 pgs.--, therefor On page 2, in column 2, under "Other Publications", line 9-11, after ""U.S. Appl. No. 12/714,429, Preliminary Amendment filed Jun. 3, 2011", 12 pgs.", delete ""International Application Serial No. PCT/US2010/44009, International Preliminary Report on Patentability mailed Nov. 4, 2011", 5 pgs.", therefor On page 2, in column 2, under "Other Publications", line 31, before "filed", insert --Application--, therefor In The Drawings On sheet 2 of 14, Fig. 2, reference numeral 238, delete "238" and insert --236--, therefor  
On sheet 8 of 14, Fig. 8C, reference numeral 848, line 1, delete "PERFORMANCE" and insert --PERSPECTIVE--, therefor Signed and Sealed this  
Twenty-first Day of April, 2015

Michelle K. Lee  
*Director of the United States Patent and Trademark Office*

In The Specification

In column 3, line 55, delete "computer" and insert --compute--, therefor

In column 6, line 3, delete "236" and insert --230--, therefor

In column 7, line 56, delete "constraintsto" and insert --constraints to--, therefor In column 13, line 40, after "editing", insert --engine--, therefor In column 13, line 40, delete "826" and insert --806--, therefor In column 14, line 39, delete "848" and insert --850--, therefor In column 15, line 25, delete "848" and insert --850--, therefor In column 15, line 34, delete "850" and insert --848--, therefor In The Claims In column 22, line 12-13, in Claim 1, delete "correspond" and insert --corresponds--, therefor In column 23, line 26, in Claim 11, after "plurality", insert --of--, therefor